United States Patent
Spencer et al.

(10) Patent No.: US 9,336,385 B1
(45) Date of Patent: May 10, 2016

(54) SYSTEM FOR REAL-TIME THREAT DETECTION AND MANAGEMENT

(75) Inventors: Reid Spencer, Mercer Island, WA (US); Steven Markman, Los Gatos, CA (US); Terry Beaver, Santa Clara, CA (US)

(73) Assignee: Adaptive Cyber Security Instruments, Inc., Los Gatos, CA (US)

( * ) Notice: Subject to any disclaimer, the term of this patent is extended or adjusted under 35 U.S.C. 154(b) by 1425 days.

(21) Appl. No.: 12/029,352

(22) Filed: Feb. 11, 2008

(51) Int. Cl.

| | |
|---|---|
| G06F 11/00 | (2006.01) |
| G06F 12/14 | (2006.01) |
| G06F 12/16 | (2006.01) |
| G08B 23/00 | (2006.01) |
| G06F 21/55 | (2013.01) |
| G06F 21/56 | (2013.01) |
| H04L 12/24 | (2006.01) |
| G06F 21/57 | (2013.01) |
| H04L 29/06 | (2006.01) |

(52) U.S. Cl.
CPC .............. *G06F 21/55* (2013.01); *G06F 21/554* (2013.01); *G06F 21/56* (2013.01); *G06F 21/564* (2013.01); *G06F 21/57* (2013.01); *H04L 41/0813* (2013.01); *H04L 41/0816* (2013.01); *H04L 63/00* (2013.01); *H04L 63/14* (2013.01); *H04L 63/1416* (2013.01); *H04L 63/1441* (2013.01)

(58) Field of Classification Search
CPC ....... G06F 21/56; G06F 21/564; G06F 21/57; H04L 41/0813; H04L 41/0816; H04L 63/00; H04L 63/14; H04L 63/1416; H04L 63/1441
USPC ..................................................... 726/22-25
See application file for complete search history.

(56) References Cited

U.S. PATENT DOCUMENTS

| | | | |
|---|---|---|---|
| 5,307,498 A * | 4/1994 | Eisen et al. ................... | 717/158 |
| 6,075,860 A * | 6/2000 | Ketcham ...................... | 713/159 |
| 6,229,894 B1 * | 5/2001 | Van Oorschot et al. ...... | 713/150 |
| 6,952,776 B1 * | 10/2005 | Chess .......................... | 713/188 |
| 7,096,498 B2 | 8/2006 | Judge | |
| 7,363,515 B2 * | 4/2008 | Frazier et al. ..................... | 703/2 |
| 7,437,764 B1 * | 10/2008 | Sobel et al. ..................... | 726/25 |
| 7,574,740 B1 * | 8/2009 | Kennis ............... | H04L 63/1433 |
| | | | 713/151 |
| 8,369,830 B2 * | 2/2013 | Sperti et al. .................... | 455/410 |
| 2003/0172292 A1 * | 9/2003 | Judge ............................ | 713/200 |
| 2004/0003286 A1 * | 1/2004 | Kaler et al. .................... | 713/201 |
| 2005/0005169 A1 * | 1/2005 | Kelekar ............... | H04L 63/1408 |
| | | | 726/4 |
| 2005/0033978 A1 * | 2/2005 | Hyser .......................... | 713/200 |
| 2006/0070130 A1 * | 3/2006 | Costea et al. .................. | 726/24 |
| 2006/0117386 A1 * | 6/2006 | Gupta et al. ................... | 726/23 |
| 2006/0218635 A1 * | 9/2006 | Kramer ................. | G06F 21/56 |
| | | | 726/22 |
| 2006/0294589 A1 * | 12/2006 | Achanta et al. ................ | 726/24 |
| 2007/0101159 A1 * | 5/2007 | Zhang et al. .................. | 713/193 |
| 2007/0168311 A1 * | 7/2007 | Genty et al. ................... | 706/60 |

(Continued)

*Primary Examiner* — Jayesh Jhaveri

(74) *Attorney, Agent, or Firm* — Schmeiser, Olsen & Watts, LLP

(57) ABSTRACT

A system and method for threat detection and management. The method includes: comparing the observed activity with a threat profile; generating a threat detection signal including threat information when the observed activity matches the threat profile; altering an operating characteristic of a client device in response to a threat response signal; receiving the threat information; evaluating the threat information; automatically determining an appropriate response to the threat detection signal based on an evaluation of the threat information; comparing the threat detection signal to known threat patterns; distributing new threat information if the threat detection signal does not match a known threat pattern; storing threat information; and providing a user interface information and controls for delivering control information over a control protocol.

19 Claims, 15 Drawing Sheets

(56) References Cited

U.S. PATENT DOCUMENTS

| | | | |
|---|---|---|---|
| 2007/0214088 A1* | 9/2007 | Graham et al. | 705/51 |
| 2007/0226796 A1* | 9/2007 | Gilbert | G06F 21/55 726/22 |
| 2007/0294369 A1* | 12/2007 | Ginter | G06F 21/55 709/217 |
| 2008/0027891 A1* | 1/2008 | Repasi | G06F 21/55 706/52 |
| 2008/0028469 A1* | 1/2008 | Repasi | G06F 21/554 726/24 |
| 2008/0082823 A1* | 4/2008 | Starrett et al. | 713/171 |
| 2008/0177691 A1* | 7/2008 | Alperovitch et al. | 706/48 |
| 2008/0189646 A1* | 8/2008 | Bohle | 715/781 |
| 2008/0244747 A1* | 10/2008 | Gleichauf et al. | 726/25 |
| 2009/0038011 A1* | 2/2009 | Nadathur | 726/24 |
| 2009/0178139 A1* | 7/2009 | Stute et al. | 726/22 |
| 2009/0210929 A1* | 8/2009 | Zill et al. | 726/4 |

* cited by examiner

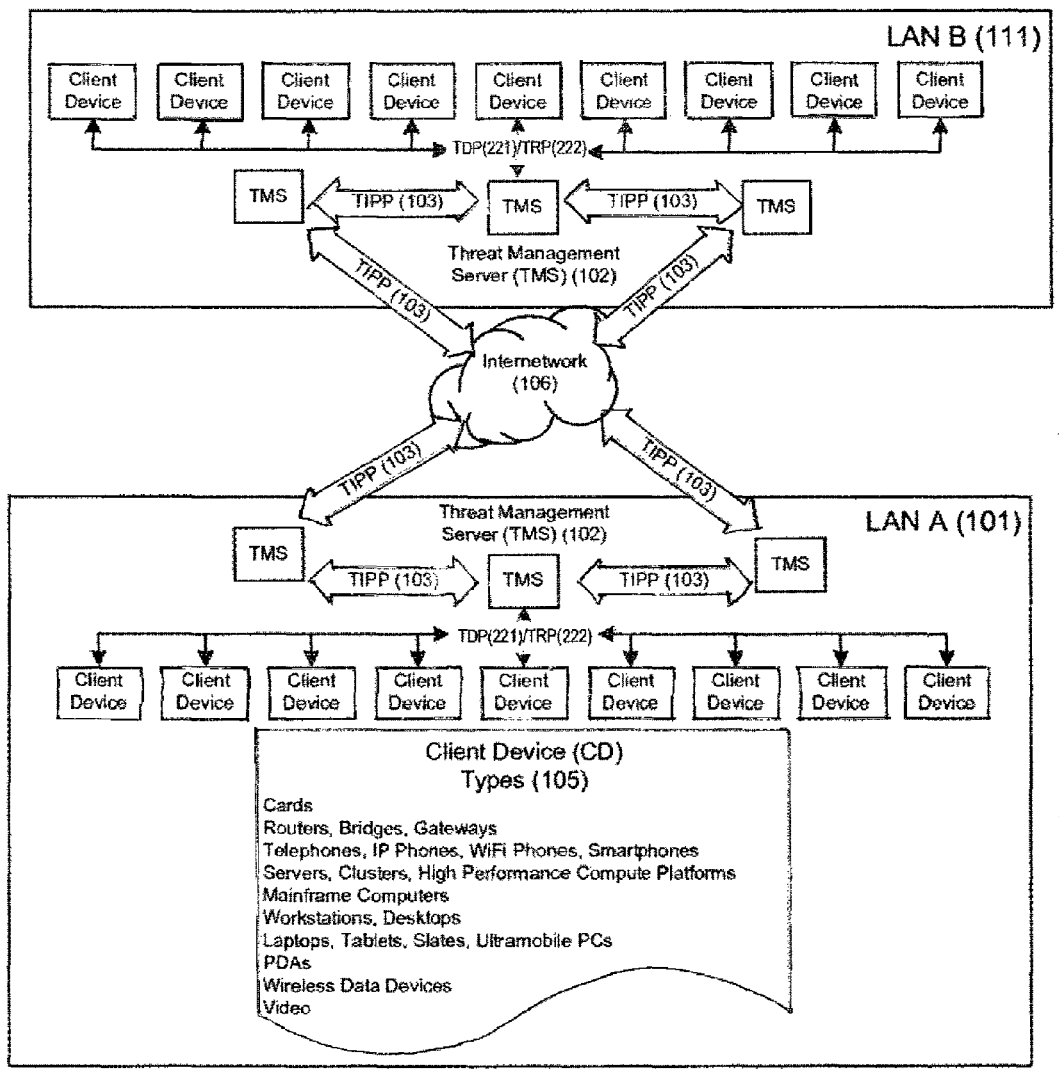
Figure 1. Federation Of Threat Management Servers

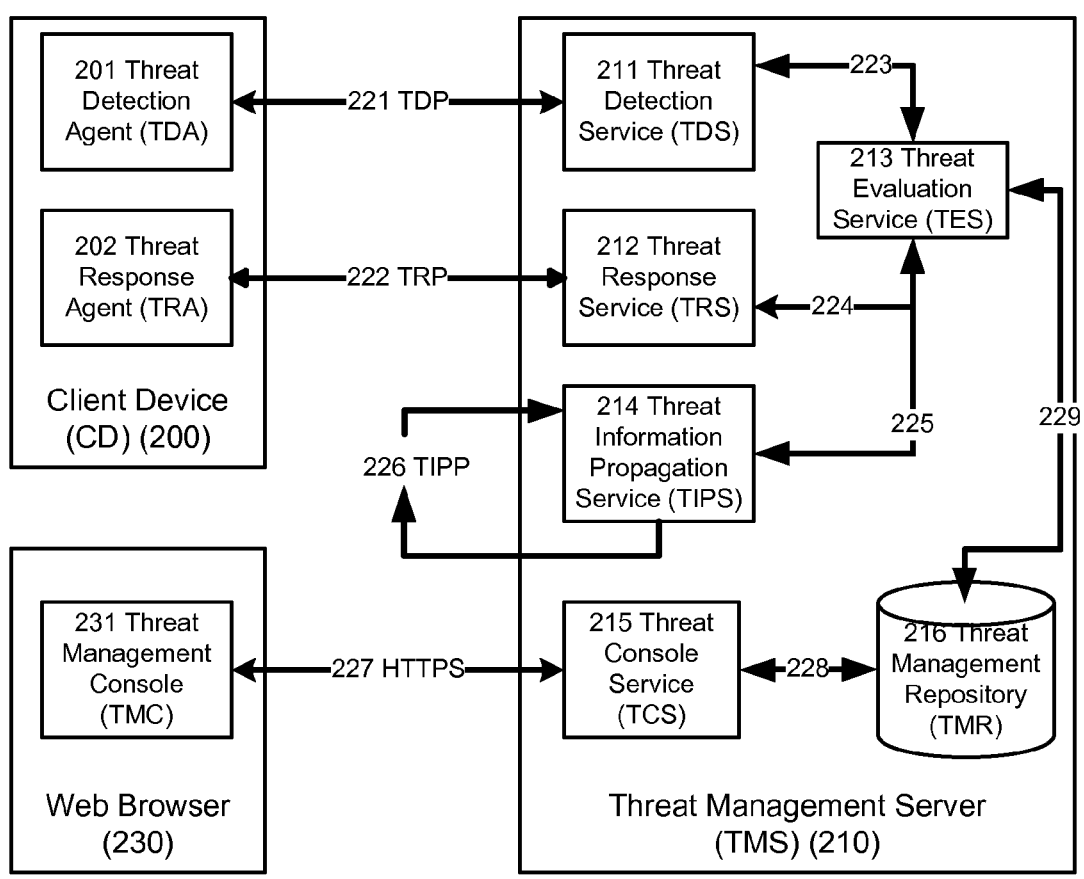
Figure 2. System Components And Relationships

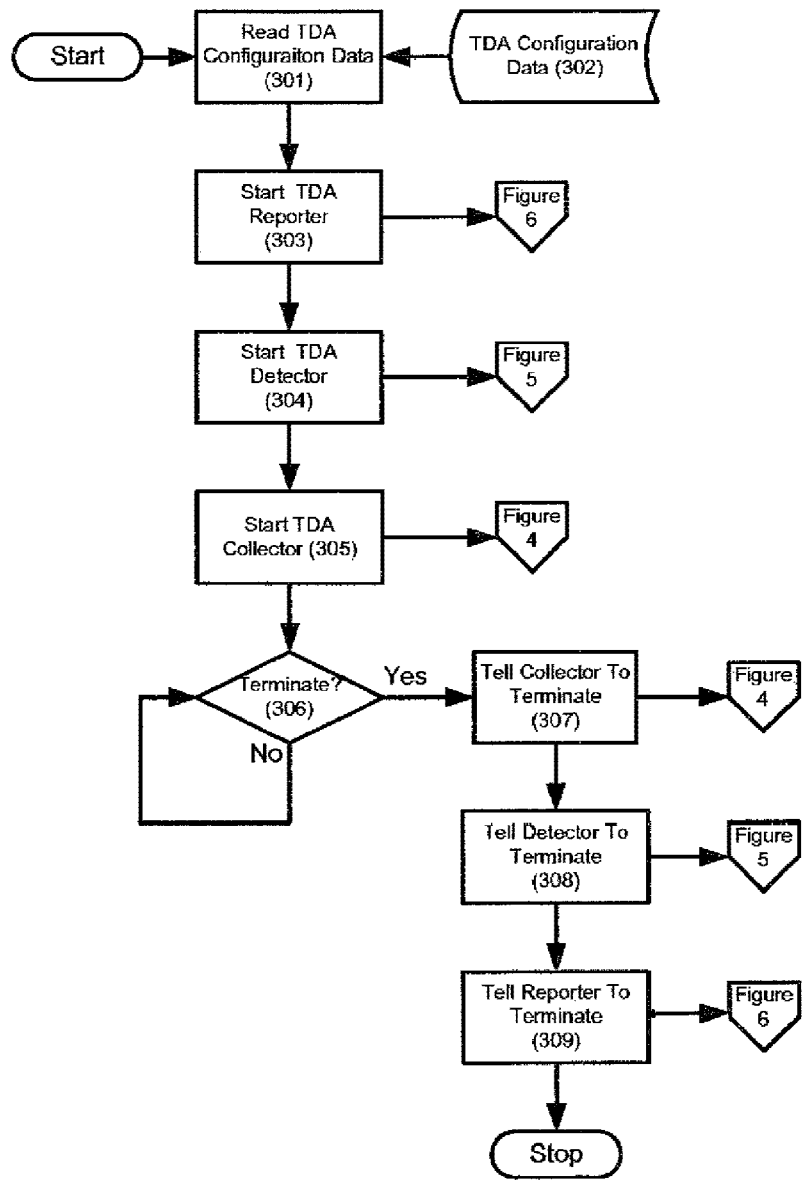
Figure 3. Threat Detection Agent (TDA) Flow Chart

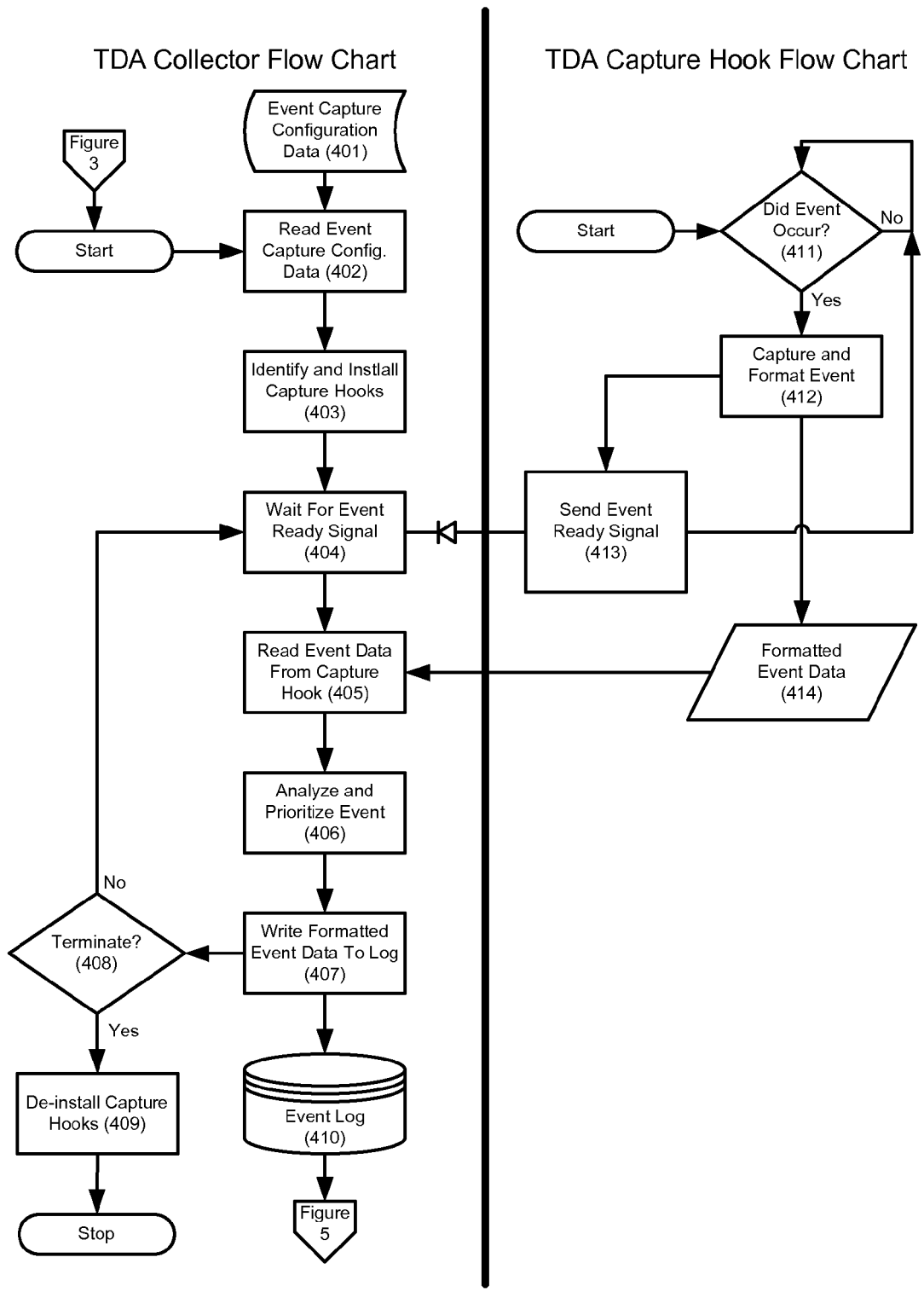
Figure 4. Threat Detection Agent (TDA) Collector Function

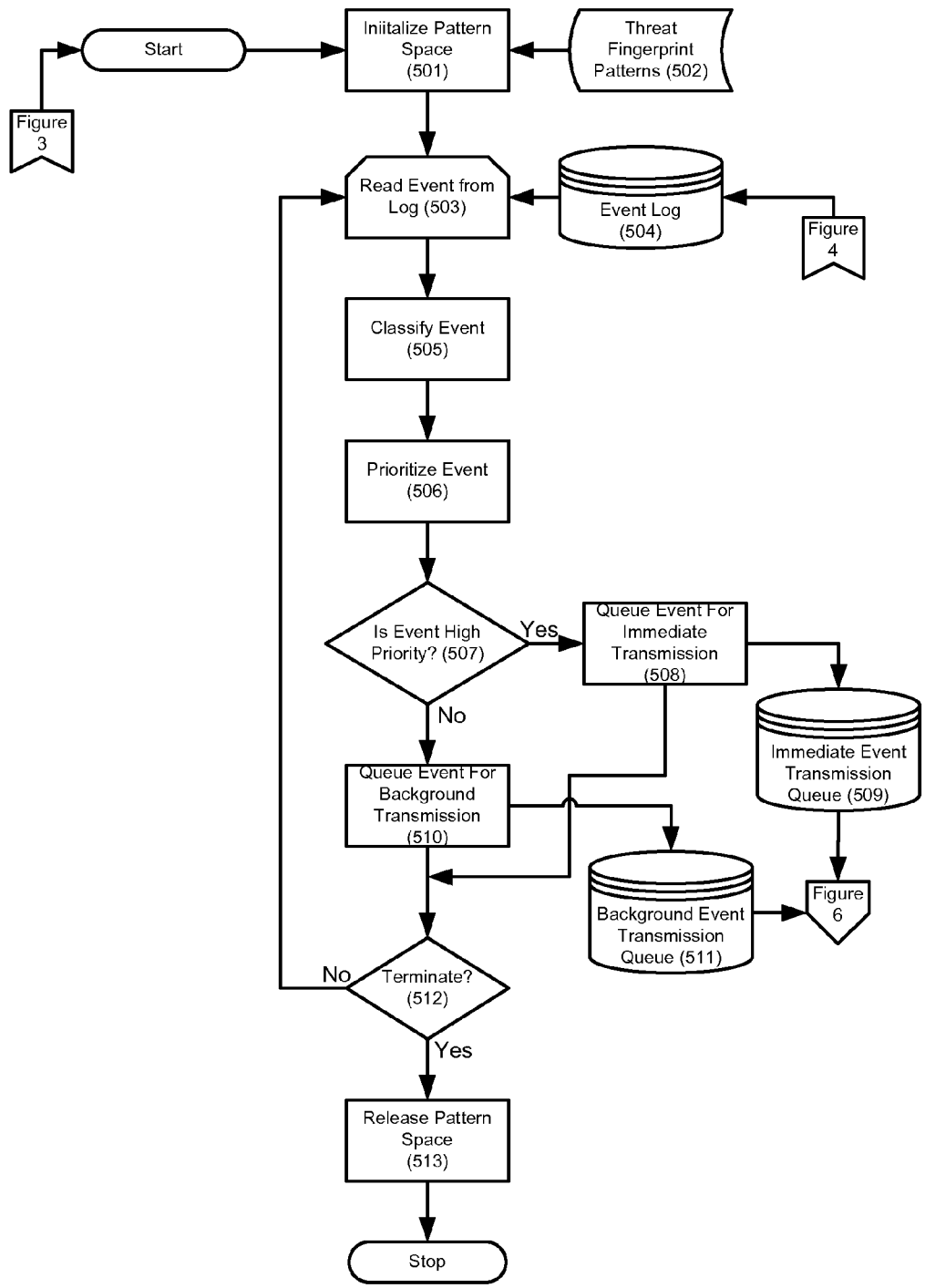
Figure 5. TDA Detector Flow Chart

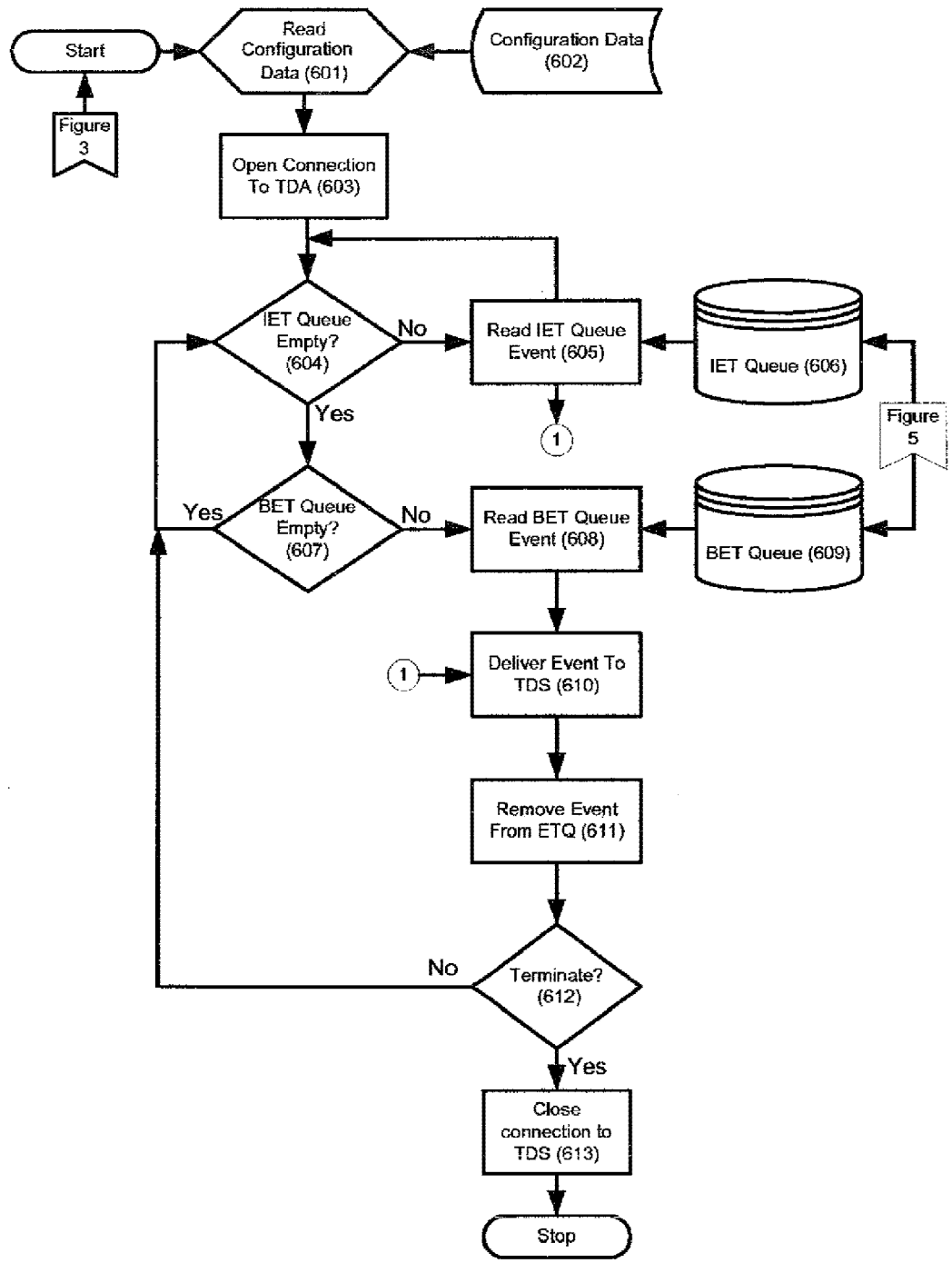
Figure 6. TDA Reporter Flow Chart

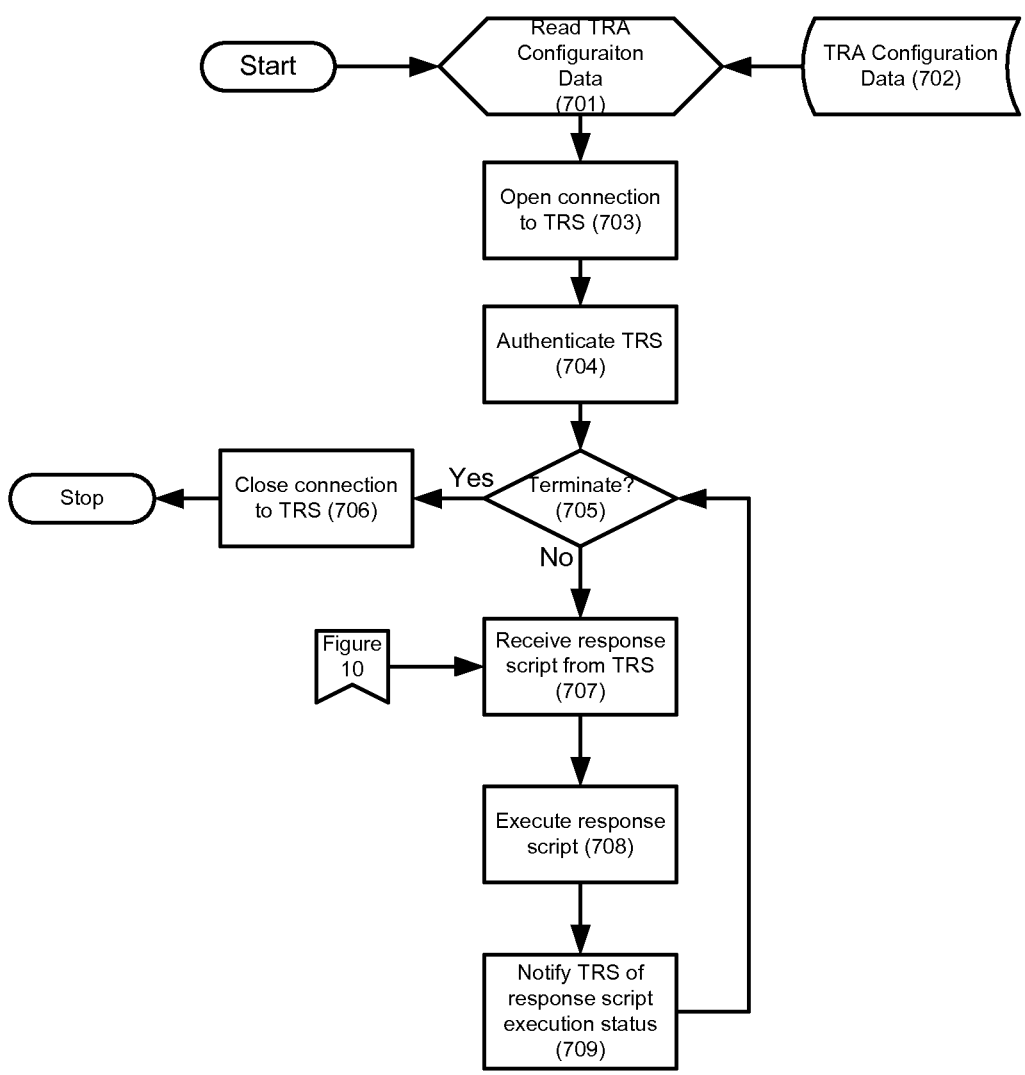
Figure 7. Threat Response Agent (TRA) Flow Chart

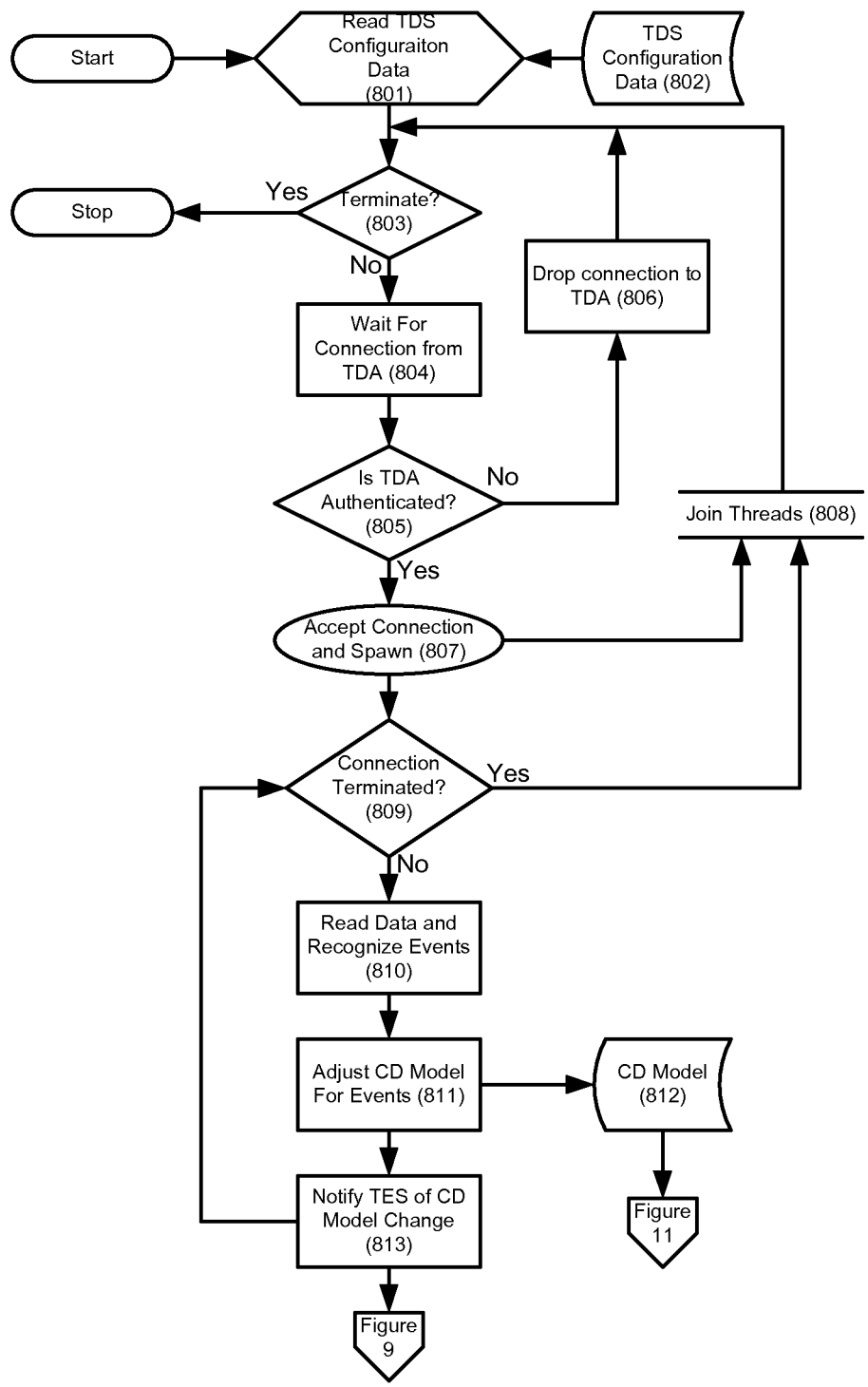
Figure 8. Threat Detection Service (TDS) Flow Chart

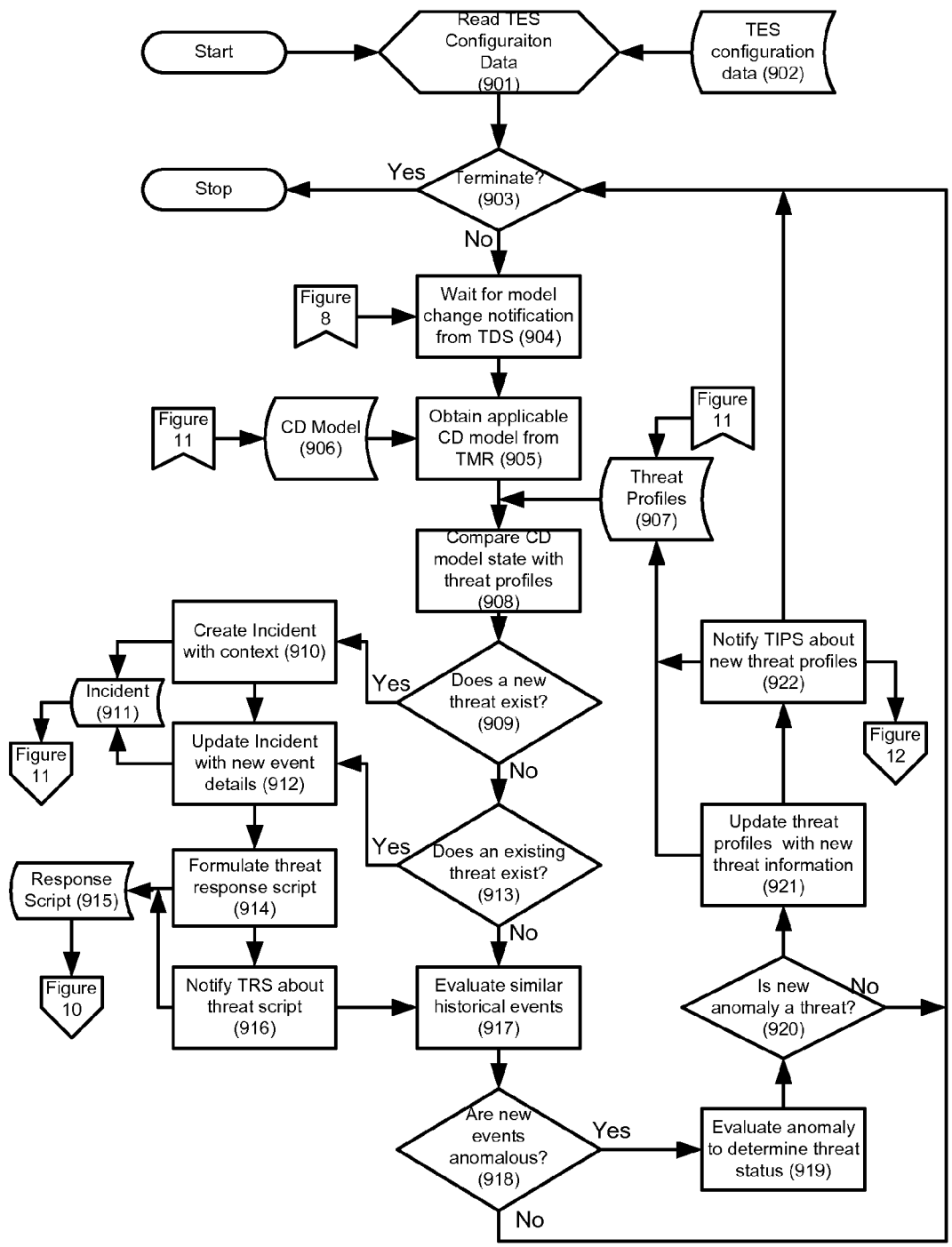
Figure 9. Threat Evaluation Service (TES) Flow Chart

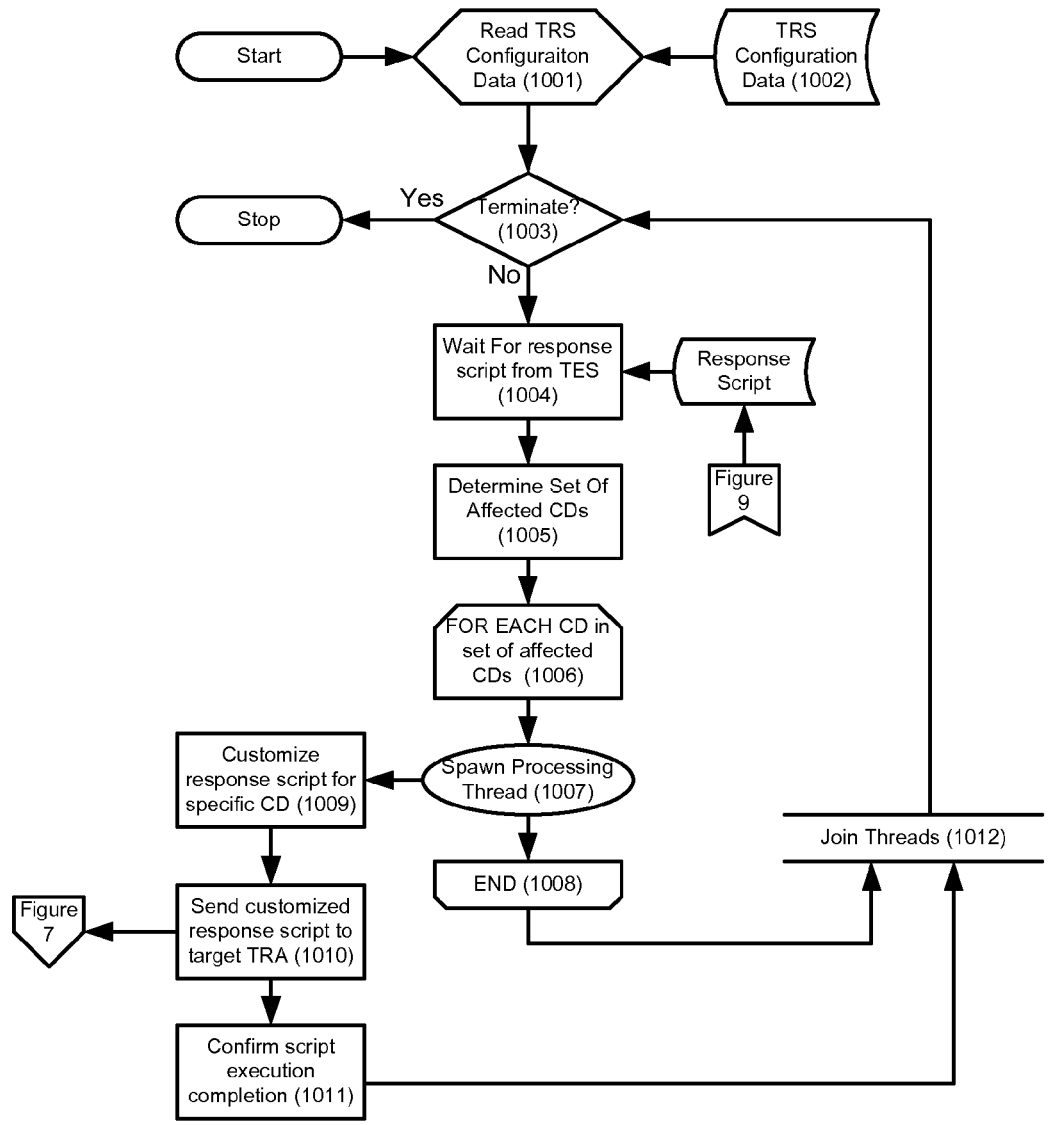
Figure 10. Threat Response Service (TRS) Flow Chart

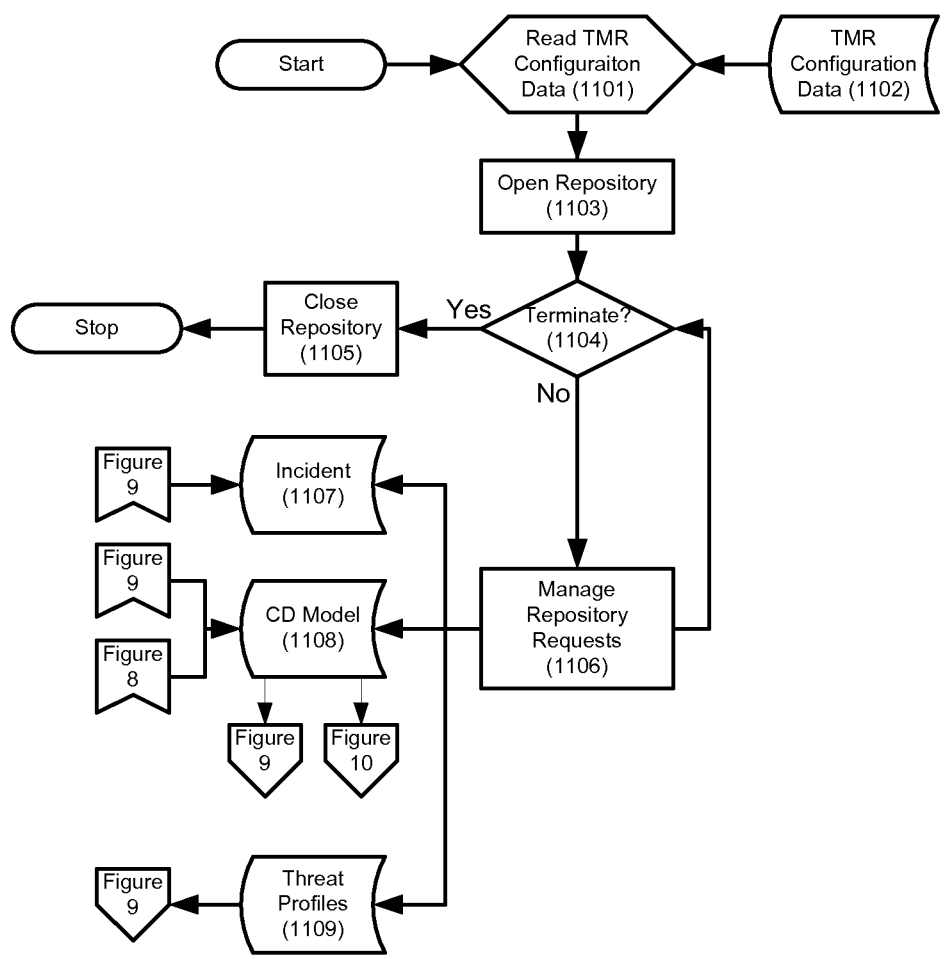
Figure 11. Threat Management Repository (TMR) Flow Chart

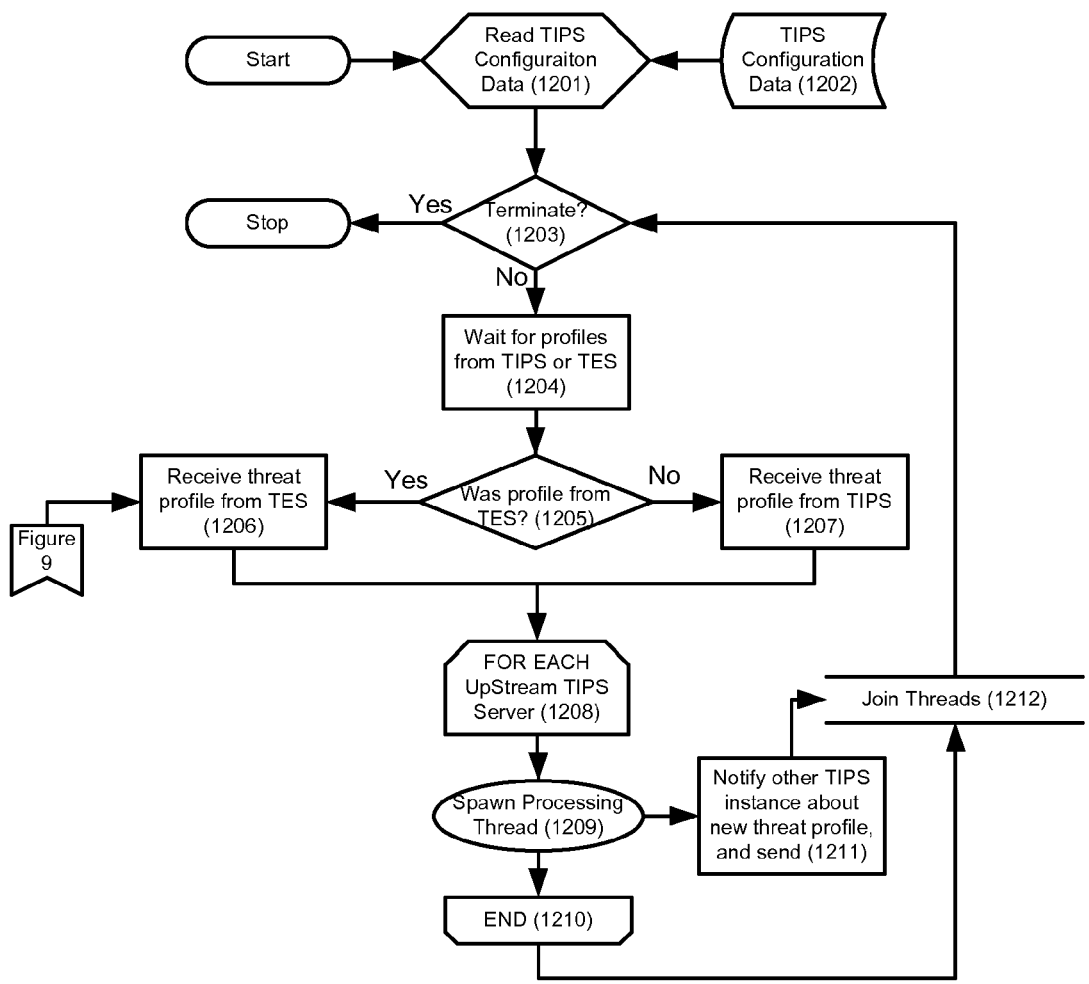
Figure 12. Threat Information Propagation Service (TIPS) Flow Chart

Figure 13. Example Message/Response Interleaving
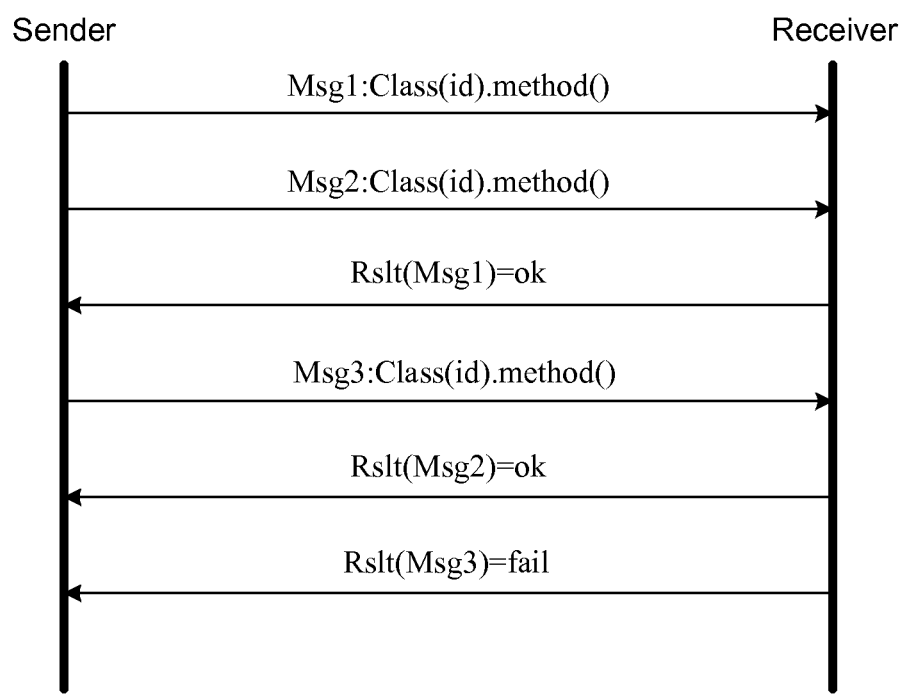

Figure 14. Protocol Object Model for the TIPP

| Result | Method Name | Parameters |
|---|---|---|
| int | newProfile | int:ProfileId, string:Profile |
| void | deleteProfile | int:ProfileId |
| string | lastProfile | null |
| null | onlySince | string:Date |
| int | newVector | int:VectorId, int:ProfileId, string:Vector |

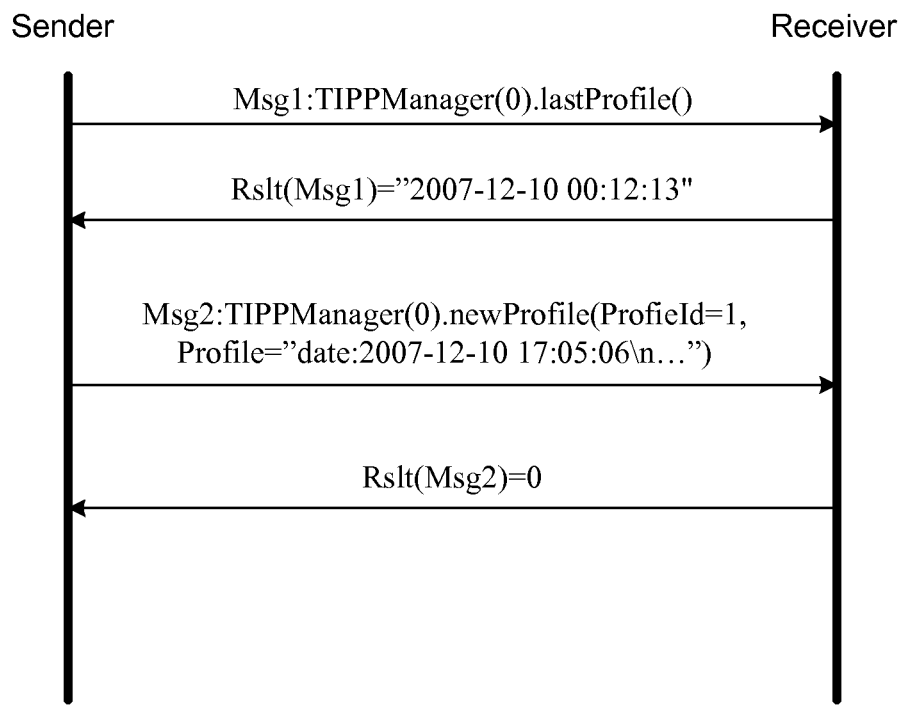
Figure 15. Example TIPS-to-TIPS Conversation

SYSTEM FOR REAL-TIME THREAT DETECTION AND MANAGEMENT

BACKGROUND OF THE INVENTION

1. Field of the Invention

The present invention relates to security, specifically to systems, methods, devices, and articles of manufacture for detecting and managing security threats.

2. Description of the Related Art

The current state of the art for threat management is a disjoint collection of tools for intrusion detection (both host based and network based), intrusion prevention and forensics. For example, the SNORT tool is a set of PERL scripts that process network traffic to detect intrusions into the network. However, SNORT does nothing to protect a computer from the effects of the intrusion, nor collect forensics quality information. A variety of host based intrusion detection products can detect local intrusions into a computer but cannot detect all hacker-based attacks or assist in the detection of large scale attacks to multiple computers or distributed attacks with different computers playing different roles.

Few of these products provide any intrusion prevention facilities and none of them provide forensics quality information or forensic evidence preservation. Forensics tools such as Encase provide excellent discovery of detailed information from disk drives with the ability to reconstruct files and file systems and determine what happened to the disk. However, these forensics tools cannot capture volatile information in real-time as threats are emerging nor take any preventative or corrective actions.

Furthermore, forensics tools are highly disruptive in their use requiring complete disk images to be created during which the machine is unavailable and following which the machine is typically wiped clean and re-installed. Current anti-virus and anti-spyware products are adept at recognizing wide ranges of known viruses and removing them but cannot automatically and readily adapt to new threats from new viruses. These products do not collect any forensics information and are not involved with identification of the effect the virus or spyware has on the computing system.

Some improvements have been made in the field. Examples of references related to the present invention are described below, and the supported teachings of each reference are incorporated by reference herein:

U.S. Pat. No. 7,096,498, issued to Judge, discloses systems and methods for detecting unsolicited and threatening communications and communicating threat information related thereto. Threat information is received from one or more sources; such sources can include external security databases and threat information data from one or more application and/or network layer security systems. The received threat information is reduced into a canonical form. Features are extracted from the reduced threat information; these features in conjunction with configuration data such as goals are used to produce rules. In some embodiments, these rules are tested against one or more sets of test data and compared against the same or different goals; if one or more tests fail, the rules are refined until the tests succeed within an acceptable margin of error. The rules are then propagated to one or more application layer security systems.

The inventions heretofore known suffer from a number of disadvantages which include: failure to provide a comprehensive security detection and/or management service for multiple devices that may be remote; failure to provide real-time forensic data; difficulty in use; slow response; inadequate response; inadequate detection; and/or inadequate threat evaluation.

What is needed is a system, method, device, and/or an article of manufacture that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available systems, methods, devices, and/or articles of manufacture. Accordingly, the present invention has been developed to provide a system, method, device, and/or article of manufacture that solves one or more of the problems described herein.

There may be a system for real-time detection and management of security threats, that may include one or more of the following: a threat detection agent (TDA) module residing on and/or in communication with a client device and including one or more of the following: instructions for observing activity occurring on or related to a client device; instructions controlling collection of data from the client device; instructions comparing the configuration of the client device against a configuration file and/or generating a threat detection signal when the observed configuration differs from the configuration file; a threat response agent (TRA) module in communication with the client device and including: instructions for altering operating characteristics of a client device in response to a threat response signal; one or more threat management server (TMS) modules in communication with one or more TDA modules and with one or more TRA modules, and physically remote from the client devices being observed, the TMS including one or more of the following: a threat detection service (TDS) module in communication with one or more TDA modules and configured to receive activity information from one or more TDA modules; a threat response service (TRS) module in communication with one or more TRA modules and configured to communicate response instructions to the TRA modules; a threat evaluation service (TES) module in communication with the TDS module and configured to evaluate activity information received from the TDS module and (1) determine if the information represents a real attack; (2) determine if the attack is a new attack; and, (3) determine an appropriate response against the attack to be communicated to the TRS module; a threat information propagation service (TIPS) module in communication with the TES module and configured to distribute new threat patterns provided by the TES module to other TIPS modules; a threat console service (TCS) module in communication with all the other modules of the TMS it resides on and configured to format and communicate user interface information and accept and process input data for distribution to and control of the modules of the TMS; a threat management repository (TMR) module in communication with the TES, TCS and TIPS and configured to store threat information; and a threat management console (TMC) module in communication with one or more TCS modules and configured to display user interface information and accept and process operator inputs.

There also may be a system wherein the TDA includes a collector module, a detector module, and a reporter module; wherein the TDA collects information via a capture hook; wherein the collector module creates an event log; wherein the detector module includes a pattern space of threat fingerprints, and the detector categorizes and prioritizes events by comparing events from the event log to the pattern space, a threat fingerprint consists of one or more specific events that imply an attack is underway; wherein the TRA is in communication with the TRS through a secure and encrypted communication channel; wherein the TMS constructs an active model of the client device and retains a historical model of the client device; wherein the TDS is in communication with the TDA through a secure and encrypted communication channel; wherein the TDS maintains a system model of the client device and communicates client system changes to the TES; wherein the TES evaluates the client activity and determines if a new threat is in progress, and if so initializes a new incident configured to record and track information regarding the threat as the threat continues; wherein the TRS compares a response script to a relevant characteristic of the client device before execution of the response script; wherein the TRS generates a response script according to a model of a client device; wherein the TMC displays information regarding a response script and enables a user to alter the displayed response script before the execution thereof; and/or wherein the TMC displays an event and enables a user to enter a response script and cause execution of the response script on the client device.

There may also be a method of real-time detection and management of security threats, comprising one or more of the steps of: observing activity related to a remote client device among a plurality of client devices remote from each other; comparing the observed activity with a threat profile; generating a threat detection signal including threat information when the observed activity matches the threat profile; altering an operating characteristic of a client device in response to a threat response signal; receiving the threat information; evaluating the threat information; automatically determining an appropriate response to the threat detection signal based on an evaluation of the threat information; comparing the threat detection signal to known threat patterns; distributing new threat information if the threat detection signal does not match a known threat pattern; storing threat information; and/or providing a user interface information and controls for delivering control information over a control protocol.

A method may also include one or more of the steps of: collecting threat information via a capture hook; creating an event log; accessing and updating a pattern space of threat fingerprint patterns; categorizing and prioritizing events by comparing events from the event log to the pattern space; creating and storing a historical model of a client device; maintaining a system model of the client device and recording system changes; and/or comparing a response script to a relevant characteristic of a client device before execution of a response script.

There may also be an article of manufacture comprising a program storage medium readable by a processor and embodying one or more instructions executable by the processor to perform a method for threat detection and management, the method comprising one or more of the steps of: observing activity related to a remote client device among a plurality of client devices remote from each other; comparing the observed activity with a threat profile; generating a threat detection signal, including threat information, when the observed activity matches the threat profile; altering an operating characteristic of a client device in response to a threat response signal; retrieving the threat information; evaluating the threat information; automatically selecting an appropriate response to the threat detection signal from a stored repository of responses based on an evaluation of the threat information; comparing the threat detection signal to known threat patterns; distributing new threat information if the threat detection signal does not match a known threat pattern; storing threat information; and/or providing a user interface information and controls for delivering control information over a control protocol.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. It is noted that the drawings of the invention are not to scale. The drawings are mere schematics representations, not intended to portray specific parameters of the invention. Understanding that these drawing(s) depict only typical embodiments of the invention and are not therefore to be considered to be limiting of its scope, the invention will be described and explained with additional specificity and detail through the use of the accompanying drawing(s), in which:

FIG. 1 is a network diagram of a system according to one embodiment of the invention;

FIG. 2 is a block diagram of a system according to one embodiment of the invention;

FIG. 3 is a flowchart illustrating a method according to one embodiment of the invention;

FIG. 4 is a flowchart illustrating a Threat Detection Agent Collector subcomponent of a method according to one embodiment of the invention;

FIG. 5 is a flowchart illustrating a Threat Detection Agent Detector subcomponent of a method according to one embodiment of the invention;

FIG. 6 is a is flowchart illustrating a Threat Detection Agent's reporter subcomponent of a method according to one embodiment of the invention;

FIG. 7 is a flowchart illustrating a Threat Response Agent subcomponent of a method of according to one embodiment of the invention;

FIG. 8 is a flowchart illustrating a Threat Detection Service (TDS) of a method of according to one embodiment of the invention;

FIG. 9 is a flowchart illustrating a Threat Evaluation Service (TES) of a method of according to one embodiment of the invention;

FIG. 10 is a flowchart illustrating a Threat Response Service (TRS) of a method of according to one embodiment of the invention;

FIG. 11 is a flowchart illustrating a Threat Management Repository (TMR) of a method of according to one embodiment of the invention;

FIG. 12 is a flowchart illustrating a Threat Information Propagation Service (TIPS) of a method of according to one embodiment of the invention;

FIG. 13 illustrates asynchronous messaging according to one embodiment of the invention;

FIG. 14 is a protocol object model for a Threat Information Propagation Protocol (TIPP) according to one embodiment of the invention; and FIG. 15 illustrates a TIPS-to-TIPS messaging method according to one embodiment of the invention.

DETAILED DESCRIPTION OF THE INVENTION

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is," "are," "characterized by," and grammatical equivalents thereof are inclusive or open-ended terms that do not exclude additional unspecified elements or method steps. "Comprising" is to be interpreted as including the more restrictive terms "consisting of" and "consisting essentially of."

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: threat fingerprints, system logs, threat histories, and/or like data useful in the operation of the present invention. As those skilled in the art will appreciate, any computers discussed herein may include an operating system (e.g., Windows Vista, XP, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, AppleTalk, IPv6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

In one embodiment, the system for threat detection and management aims to coordinate all of these activities into a comprehensive threat management system. This system records the actions being taken on computing devices and detects threats by the net effect (behavior) of those actions. This is a new approach to threat management as previous efforts have been aimed at detecting the presence of specific software, specific modifications to data or specific virus fingerprints.

In another embodiment, the system for threat detection and management does not look for these specific, known threats. Instead, it models the behavior of the system and declares any anomalous behavior as a threat, regardless of the source of that behavior. In this way, new threats are identified by their resulting behaviors without regard to how those behaviors are created. By collecting state changes within the components of the computing device, the system for threat detection and management is able to keep track of specific sequences of events, including those involving only volatile memory or transient states. This information is crucial for forensic analysis and use as subsequent legal evidence. Tracking of these events allows reconstruction of the entire sequence of events leading to an attack and positively identifying the source(s) of that attack. In the same fashion, the system for threat detection and management aims to provide such reconstructive capabilities as well as executing preventative and corrective actions in real time.

FIG. 1 is a network diagram of a system for threat detection and management. In one embodiment there is a federation of Threat Management Server (TMS) systems. FIG. 1 also illustrates the types of equipment that may be monitored via the system. Additionally, there is shown a representative construction of two local area networks with multiple TMS systems/modules each and the federation of the machines via the Threat Information Propagation Protocol (TIPP) module. The Client Device module can be any electronic device that has a network connection to the TMS modules and the types of equipment that can be monitored.

As shown in FIG. 1, there is a representative example of the federation of Threat Management Server modules. The large boxes LAN A (101) and LAN B (111) represent two separate networks of Client Device modules (CD, 105) connected to Threat Management Servers (TMS, 102). The Threat Management Server modules share threat information via the Threat Information Propagation Protocol module (TIPP, 103), which can be reliably and securely transmitted over a network module, such as but not limited to, the Internet (106). Each TMS module (102) can be configured to receive and transmit threat profile information via the TIPP module (103) to any number of other TMS modules (102). The TMS modules may be configured into a hierarchy so that threat information is reliably disseminated from the detection points upwards to the root of the hierarchy and then back down to other TMS modules (102) in the larger network. In this way threat information is distributed quickly throughout the network/Internet or a corporate or agency network. Threat profile information communicated by the TIPP module (103) between TMS modules (102) consist of two basic kinds of information: a) patterns for the sequence of events and conditions that identify the threat, and b) response scripts that specify the actions to be taken when the threat is recognized.

In one embodiment, the Client Device (CD) modules (105) are equipped with software components to communicate events of interest occurring on a Client Device module up to a TMS module (102) responsible for that CD module. CD modules may be any electronic device and/or module capable of transmitting data over a network. Additionally, FIG. 1 shows several representative examples of such devices/modules ranging from large mainframes, desktops and servers down to Personal Digital Assistants (PDAs), telephones, video cameras and even individual embedded devices. Advantageously, the illustrated approach is intended to work similarly to the DNS protocol. Each server will retain threat profiles applicable to the set of client devices being monitored for threats and intrusions.

FIG. 2 is a block diagram of a system for threat detection and management. As shown the Client Device module (105) comprises two components: a Threat Detection Agent (TDA) module (201) and Threat Response Agent (TRA) module (202). The Threat Management Server (TMS) module (102) comprises six components: a Threat Detection Service (TDS) module (211), a Threat Response Service (TRS) module (212), a Threat Evaluation Service (TES) module (213), a Threat Information Propagation Service (TIPS) module (214), a Threat Console Service (TCS) module (215), and a Threat Management Repository (TMR) module (216). Additionally, the system may include a user interface component module, or graphical user interface (GUI) module (230), the Threat Management Console (TMC) module 231 capable of running inside any commercial or open source Web browser software (230).

FIG. 2 further illustrates the components of the system for threat detection and management and their basic interactions. There is shown three computing devices: one or more Client Device (CD) modules (200), a Threat Management Server (TMS) module (210), and a Web browser module (230). Each of these devices incorporates running software components that comprise the current invention. The one or more Client Device modules (200) comprise two components: the Threat Detection Agent (TDA) module (201) and the Threat Response Agent (TRA) module (202). The TDA module and the TRA module communicate with corresponding services in the Threat Management Server (TMS) module (210), namely the Threat Detection Service (TDS) module (211) and the Threat Response Service (TRS) module (212).

Additionally, in FIG. 2, there is a Threat Detection Protocol (TDP) module (221). The TDP module functions and/or includes instructions for communicating client activity and potentially threatening events of interest from the TDA module (201) to the TDS module (211). Also shown, there is a Threat Evaluation Service (TES) module (213). The TES module receives and evaluates the inputs from the TDS module (211), via an internal communication protocol (223). The TES module (213) determines if responses are needed. If such responses are needed, the TES module (213) formulates a response and communicates with the TRS module (212), via an internal communication protocol (224), to send responsive actions to the TRA module (202).

In an additional embodiment, the TES module (213) may also function to forward threat information to and/or receive threat information from the Threat Information Propagation Service (TIPS) module (214), via an internal communication protocol (225). The TIPS module (214) communicates and distributes threat information between various TMS modules (210) using the Threat Information Propagation Protocol (TIPP) communication protocol (226). The TES module (213) and TCSmodule (215) cooperate, via internal communication protocols (228 and 229) to manage access to the Threat Management Repository (TMR) module, (216) which may be a database or other form of data repository of threat information. The TCS module (215) provides a user interface via the HTTPS protocol (227) that is presented in an administrator's web browser as the Threat Management Console (TMC) module (231).

FIG. 3 is a flowchart illustrating a method for threat detection and management. The illustrations in FIG. 3 are focused mainly on the function of the Threat Detection Agent (TDA) module (201). The method as illustrated includes the steps of initializing (301), (302) configuration data of the TDA from a data storage module, or local memory or storage location; initializing (303) the TDA reporter Module; initializing 304 the (TDA) detector module; and initializing (305) the TDA collector module. In one embodiment, initializing (303), (304), (305) each of the reporter, detector, and collector modules occurs serially. Upon initialization and/or invocation of the reporter, detector, and collector modules the TDA module waits (306) for the termination conditions to occur. Upon occurrence of the termination conditions, the TDA module instructs (307), (308), (309) the reporter, detector, and collector modules to terminate and/or shut down.

In one embodiment reading and/or initializing (301) the configuration data of the TDA module may include any configuration data contemplated in the art. Some non-limiting examples of configuration data may include: specifications of where the TDA module should execute, specification of the conditions under which one or more the reporter, detector, and collector modules should terminate, and/or so forth.

FIG. 4 is a flowchart illustrating a method and/or functioning of the Threat Detection Agent (TDA) collector module of the method. The function of the TDA collector module is to collect the events of interest happening on the Client Device module that may indicate a threat. This collection occurs in two parts. Collection of raw events is done asynchronously by a capture hook and shown on the right side of the diagram. When events are ready, they are read by the collector and logged accordingly.

As illustrated in FIG. 4, the method associated with the function of the TDA collector module includes the steps of:

1) Reading (402) configuration data (401) (the configuration data comprising information about the set of capture hook points necessary to collect information from the Client Device module);

2) Identifying (403) and installing (403) capture hooks necessary to collect information from the Client Device module. A capture hook is a small piece of software designed to "hook" a device, operating system, application or program for the purpose of capturing events of interest;

3) Waiting (404) for an asynchronous event ready signal from any of the installed hooks;

4) Reading (405), analyzing (406) and prioritizing (406) the data and event received from any of the installed hooks; and 5) Writing (407) the formatted data/event to an event log (410). Subsequently, as illustrated, the TDA collector module checks 408 to see if it is time to terminate the collector (as a signal from the TDA), (307). If it is, the TDA collector module terminates by de-installing the capture hooks (409) and stopping. Otherwise, the collector repeats the process by waiting again for an event ready signal (404).

In one embodiment, capture hook modules collect a variety of information and/or data from the Client Device module. A capture hook module may comprise one or more small code modules which function in capturing status and/or event data from a computing module, such as but not limited to a Client Device. Further, the one or more small code modules function to deliver the status and/or event data to the TDA collector module. In a non-limiting example, the capture hook modules may include a capture hook module for each type of information to be collected. Capture hook modules may be transparent, meaning a capture hook module does not alter functioning of the system. Additionally, capture hook modules may be self-installing, meaning the capture hook module may self-install in a client device module.

In another embodiment, a capture hook module may use, but is not limited to, the following mechanisms: registration for and receipt of Windows Management Instrumentation (WMI) events; execution stack probing; operating system call tracing; operating system performance monitoring interface; debugging trap points or trace points; direct injection of instrumentation code into executables, libraries, DLLs, shared objects, JAR files or other executable entities; direct injection of instrumentation code into the operating system via device drivers, kernel modules or other facilities of the operating system that permit kernel mode execution; instrumentation of boot-up or start-up initialization; and/or so forth.

In another embodiment, the information and/or data collected by the capture hook modules may comprise two categories: passive information and active information. Passive information may include and/or be characterized by certain components of the system model, which are considered to change slowly or not at all. These components are deemed static (although they may change infrequently). This kind of information is collected passively but in detail (full information) and at a lower priority than active information. In general this information is voluminous. The Passive information is used to build a model of the client device module's state. Passive collection deals with information such as, but not limited to: the hardware devices from which the computing system is composed; operating system details such as type, version, patch level, customizations, static configuration data, device drivers, etc.; arrangement of file systems on the storage devices; and/or installed software applications and their patch levels.

In another embodiment, the type of information and/or collection of information may be classified as Active information. Active information may be characterized by the information resulting from users and software interacting with a computing system. In a non-limiting example, user and/or software are initiating changes that have various effects on the computer's hardware and software. Such events are deemed active because they cause near instantaneous changes in the system. Active collection deals with information such as, but not limited to: 1) upon starting a new process, collect: Process id, full path to executable program, environment, arguments, list of DLLs it opens, registry settings belonging to it, time of startup, user that ran the process, security context, and other process-level information; 2) upon starting a new thread collect its thread id, execution address; 3) when a process opens a socket collect the end point information and as much protocol information as possible; 4) when a process opens a file, collect the: file name, file size, file handle mode (read, write, append), owner, permissions, and other information about the file; and 5) any change to the registry. Additionally, Active information may include suspicious actions and/or events, such as but not limited to:

Using a program name that is used by a different executable, especially one that has many instances running (e.g. masquerading as svchost.exe)

Consuming a large amount of the CPU cycles for long periods of time;

Significant amounts of data communications to IP addresses outside the organizations private network (i.e. via internet);

Auditing/logging disabled;

Acquiring system privileges that a user on this machine should not have;

Hiding program data in registry values;

Hiding program data in an Alternate Data Stream in NTFS;

Affecting startup registry settings to run unapproved software; and/or so forth.

In another embodiment, when an attack is under way or imminent, the TMS modules can put their TCS modules into an evidence collection mode. In this mode all internal modules of all TMS modules collect and/or analyze the information that may be potentially dangerous. In addition to the foregoing, the evidence collection mode also collects the following information: delta compressed screen shots from the TCS/TMC, twice per second (throttled) to capture user interface changes for replay during an event. Screen shots are stamped with time and identification information; keystroke logging; mouse action logging; logging of alternate user input devices (tablets, keypads, retinal scanners, card readers, etc.); more detailed information on all active information; increased priority to the collection and transmission of any backlog of passive information; memory, Disk, Network, CPU and device performance monitoring; in depth investigation into suspect processes (data acquisition from network connections, contents of files read or written, memory scans, contents of documents printed, etc); and/or so forth.

FIG. 5 is a flowchart illustrating a Threat Detection Agent detector subcomponent of a method for threat detection and management. There is shown a flow chart for the operation of the Threat Detection Agent detector module. The Threat Detection Agent detector module functions and/or is configured to be responsible for reviewing the events collected by the collector module as described in the previous paragraph and FIG. 4. Additionally, the Threat Detection Agent detector module functions to analyze and assess threat levels of events and/or data. The detector module reviews this information to detect obvious threats based on small numbers of temporally close events. The detector module looks for attack fingerprints and determines if events are suspicious or not. Also illustrated in FIG. 4 is the TDA Capture Hook Flow Chart. As shown in FIG. 4, the TDA module starts by evaluating the event in "Did Event Occur?" module (411); if yes is the condition found then the information it is captured and formatted in "Capture and Format Event" module (412) and sent to "Send Event Ready Signal" and "Formatted Event Data" modules (413) and (414), respectively. Subsequently information is transmitted from Send Event Ready Signal module (413) to Wait for Event Ready Signal module (404) and the formatted data is sent from the Formatted Event Data module (414) to Read Event Data From Capture Hook module (405).

As illustrated in FIG. 5, the detector module begins by initializing (501) the pattern space from a collection of threat fingerprint patterns (502). The patterns specify events and context that represent threats. These patterns are compiled to state machines for fast recognition of threats. Next, the Detector reads (503) an event from the event log (504) created by the collector module. The event is classified (505) and prioritized (506) by running the event through the pattern space. If the event's priority indicates (507) immediate transmissions to the TDS then the event is queued (508) in the immediate event transmission queue (509). If not, then the event is queued (510) in the background event transmission queue (511). Finally, the detector determines (512) if it has been required to terminate by a signal from the TDA module. If a termination signal has been given and/or received, the detector module releases (513) the pattern space and stops (513). Otherwise, the detector module loops back to read the next event (503) from the event log (504).

In one embodiment, there are one or more event classifications. These event classifications include: Normal, wherein the event is considered normal operation of the client device; contextually suspicious, wherein the event is not indicative of a threat by itself, but is suspicious within the context that it occurred; suspicious, wherein the event is suspicious on its own, without context; and threat, wherein the event is a threat on its own, indeed, no additional context or subsequent events are needed to make a determination of its threat status.

In another embodiment, contextually suspicious may include and/or require further processing to determine its actual threat status. In a non-limiting example, writing a file is not normally suspicious, but writing a file to a file system the user normally doesn't have access to would be contextually suspicious.

In yet another embodiment, those events in the suspicious classification may include kinds of events that are suspicious by their mere presence. In a non-limiting example, listening on a socket might be considered suspicious. Whether it's a threat needs more analysis with subsequent events to determine how that socket is being used.

FIG. 6 is a flowchart illustrating a Threat Detection Agent's (TDA) reporter module subcomponent of a method. The reporter module reads event data from two queues, one immediate and one background. All Immediate events are reported before background events. Background events are reported when there are no immediate events to report. These events are reported and/or communicated to the Threat Detection Service (TDS) module. One of the functions of the reporter module includes managing the communication between the TDA module and the TDS module. The reporter module takes information from the detector and transmits it up to the TDS.

As illustrated in FIG. 6, the reporter module first reads (601) its configuration data (602). The Reporter module configuration data includes network settings and data for making a secure connection to the TDS modules. A connection is then made (603) to the TDS module. If the Immediate Event Transmission (IET) module queue is not empty (604) then an even is read (605) from the IET module queue (606). Otherwise, if the Background Event Transmission (BET) queue is not empty then read (607) an event from the BET queue (609). If one or both of the IET module and/or the BET module read (605), (609) a queue event, the one or more events are delivered (610) to the TDS module (610). The delivered event is subsequently removed (611) from the queue from which it originated. Finally, the method includes checking (612) if the TDA has signaled a termination condition. If no termination condition is signaled then the method loops (612) back to process (604), (607) more events from the queues. If a termination condition is signaled then the connection to the TDS is closed (613). In one embodiment, events and/or event data reported to the TDS use an object-based model of the Client Data. Events are reported against the objects and/or data in the model Client data as described for the Threat Detection Protocol (TDP), as described herein.

FIG. 7 is a flowchart illustrating a Threat Response Agent (TRA) subcomponent of a method for threat detection and management. The TRA module receives response scripts from the Threat Response Service (TRS) and executes them on the Client Device module. In one embodiment, threat response scripts indicate what responsive actions should be taken when a threat has been detected. In another embodiment, the TRA module is a software component running on the Client Device module that executes response scripts at the request of the TRS. The TRA module permits appropriate preventative, corrective, or damage control actions to be taken in response to threats identified by the TRS module.

As illustrated in FIG. 7, the TRA module begins by reading (701) the TRA module configuration data (702). The configuration data includes networking information to make a connection to a Threat Response Service (TRS) module, as described herein. The TRA module then opens (703) a connection to the TRS module and authenticates (704) and/or authorizes (704) the TRS module. Authentication (704) and authorization (704) may be required to avoid spoofing or man-in-the-middle attacks against the Client Device module. Once a successful connection has been made, the TRA module checks (705) to see if it should terminate (706). If termination (706) is required, the TRA module closes the connection and stops. If no termination condition (706) is set, the TRA module waits (707) until a response script arrives from the TRS (707) by the TRA module from the TRS module, the TRA module executes (708) that response script on the Client Device module. The execution status of each step of the script is reported (709) back to the TRS module. Once an execution status is reported (709), the TRA module loops back, checking (705) for a termination condition (706). This loop continues until a termination condition (706) is found.

In one embodiment, response scripts are a set of textual commands that list the sequence of actions to be taken on the Client Device module. The actions that can be taken depend upon the nature of the Client Device module. Some non-limiting examples of actions include: blocking a network port; terminating a running program; preventing user input; displaying a message to the user; preventing disk write access; tracing the activities of certain programs in forensic level detail; and/or so forth.

FIG. 8 is a flowchart illustrating a Threat Detection Service (TDS) module of a method for threat detection and management. In one embodiment, the TDS module functions to accept, authenticate, and authorize network connections from the Threat Detection Agent (TDA) modules and their components. The TDS module further functions to drop and/or terminate connections not authenticated or authorized. For each successful connection, the TDS module spawns a thread that reads events coming in from the TDA's reporter module. Those events are used to update a model of the Client Device module's state and notify the Threat Evaluation Service (TES) about the state change caused by the events. In another embodiment, the TDS module is a software component that executes on the Threat Management Server (TMS, 210). The TDS module additionally functions to receive events from multiple TDA modules/components and process them.

As shown in FIG. 8, The TDS module begins by reading (801) the TDS module configuration data (802) from storage. The TDS module configuration data may include data and/or details about the networks and Client Devices from which it will accept connections.

In one embodiment, the TDS module includes and/or configures a list of Client Device modules and/or networks. Upon reading (801) configuration data, the TDS module checks (803) to see if termination has been requested. If there is termination condition, the TDS module stops and/or terminates. If no termination condition is present, the TDS module waits (804) for a connection and/or connects with the Reporter module/component of the TDA module. Upon connecting (804) with the Reporter module, the connecting TDA is authenticated (805) against the configuration data (802). If the TDA module is not recognized, the connection is dropped (806) and the TDS module loops back to check (803) for the termination condition again. If the TDA module is recognized, the TDS module spawns (807) a thread to process the data received from the TDA module.

The main thread loops back to check (803) for the termination condition again. The spawned thread checks (809) to see if the connection to the TDA module has been terminated. If there is a termination condition, the thread ends (808). If no termination condition is present, the TDS module reads (810) and interprets (810) events from the TDA module and adjusts (811) the system model (812) that represents the TDA's Client Device module (811). Finally, the TDS module via the thread notifies (813) the TES (813) about the change in the system model for the client and loops back to check (809) for connection termination.

FIG. 9 is a flowchart illustrating a Threat Evaluation Service (TES) module of a method for threat detection and management. The TES module evaluates events to determine if a threat exists. The TES module additionally detects anomalous events and investigates them to determine if they might represent a new kind of threat. The evaluation process may include comparing the client device's active system model and event flow with threat profiles of potential threats. Those profiles can be updated as new events are received. When events are detected as threats, a generic response script is formulated to thwart the threat, according to policy, which is sent to the Threat Response Service (TRS) module for dissemination to all applicable Client Device modules.

In one embodiment, the TES module is a software component that reviews the models provided by the Threat Management Repository (TMR) module to detect threats, potential attacks, and in-progress attacks. The TES module combines the TMR module's model state with notifications from the TDS module component to proactively identify suspicious events, anomalous behavior, threats and attacks. In an additional embodiment, the TES module may look for patterns of attack, correlate cross-machine activities, provide forward and backward chaining to determine attack vectors, make response action recommendations to the TRS module, and/or so forth. In one non-limiting example, when an anomaly, threat, and/or attack has been identified, the TES module's response to the identified threat/attack situation is based on the information in the TMR module model. The TES module forwards that response to the TRS module for execution by the TRA modules on the appropriate Client device modules.

As illustrated in FIG. 9, the TES module functions by first reading (901) the TES module configuration data (902). The TES module then checks (903) to see if the termination condition has been set. If there is a termination condition, the TES module stops and/or terminates. If no termination condition is present, the TES module waits (904) for a notification of CD model change from the TDS module. When notification from the TDS module is received (904) the TES module loads (905) the corresponding CD model (906) from the TMR module (See FIG. 11). The CD model (906) is then compared (908) against the existing threat profiles (907), also loaded from the TMR module. This comparison is used to determine (909) if one or more new threats have been identified. If a threat has been identified (909), the TES module creates (910) a new incident that will track the identified threat as it progresses.

Incidents are vended from the TMR module. If a new threat was not identified, the TES module determines (913) if an existing threat, and/or corresponding incident exist (911). If a new threat exists and/or an existing threat exists, the incident is updated (912) with the details and/or data of the threat. The TES module then formulates (914) a response script based on the incident details. The response script (915) may include and/or be defined by actions to be taken on a Client Device module based on response policies. The response script (915) is then delivered (916) to the TRS module and/or notifies (916) the TRS module for further processing.

Additionally, as shown in FIG. 9, the TES module reviews (917) previous events for the CD and compares them to the current events to detect (918) event anomalies. The detection of anomalous events involves comparing currently occurring events with historical events for each component (program, service, hardware, etc.) on the CD. Consequently, acquiring historical information about a CD before a determination of which events are anomalous may complicate detection of anomalous events. In other words, the TMR will have to be "trained" (initialized) for a given CD.

Event data in the TMR is generally trained (or initialized) for each CD before that CD is put into service. To accomplish this, a new CD must be connected to the TMS in a clean environment (one in which no known threats exist and it is physically disconnected from outside sources of threats). Network isolation is generally beneficial in accomplishing this. During this training phase, the TMS is put in a mode where events coming from the CD are simply recorded (via the usual path from TDA to TDS to TMR). In this mode the TES generally does not evaluate the events or attempt to detect anomalies. Since physical security restricts the occurrence of anomalous events, it is simpler to have the TES bypass detection of anomalous events. After the training mode has been established, programs are run on the CD in the normal usage mode. As closely as possible, the typical workload expected for the CD is invoked. In this way, the TMR is populated with event data that defines the events and patterns of events that are considered acceptable or normal. Once training has been completed, the CD is put into service and training mode for that CD is terminated. At this point, any anomalies detected by the TES will be reported.

In one embodiment, a TES detects anomalous events (918) by using two methods: (a) events that have never been seen before (e.g. a program that's never been run before), and (b) events that are statistically different from the norm for the CD. For the former, a simple comparison of the current event with the history of events on that CD will determine whether that event has occurred or not. If it has not, the current event is deemed anomalous. For example, consider a program on a CD that opens a socket for listening. This might be part of its normal operation (e.g. a web server) or it might be an indication of a virus or Trojan horse (e.g. an exploit that loads a payload to listen for commands from the attacker). If that program had never exhibited that behavior in all its previous runs then opening that socket would be considered an anomalous event and should be detected by the TES. This is an example of the former method (a) of event anomaly detection (918). For the latter method (b), a statistical analysis is used based on the event's parametric values.

In one embodiment, a statistical method of anomaly detection involves computing the mean and standard deviation of any numeric event parameters. In general, any event parameter whose value exceeds the mean value plus or minus some multiplicative factor of the standard deviation and is beyond threshold limits that are considered normal will be deemed anomalous.

In one embodiment, determining if an event's parameter value constitutes an anomalous event, we may use a formula similar to the following:

$$((\text{CurrentValue} < \text{Mean} - N*\text{StdDev}) \text{ or}$$
$$(\text{CurrentValue} > \text{Mean} + N*\text{StdDev})) \text{ and}$$
$$((\text{CurrentValue} <= \text{MinThreshold}) \text{ or}$$
$$(\text{CurrentValue} >= \text{MaxThreshold}))$$

Where:
CurrentValue is the value of the parameter being considered
Mean is the arithmetic mean of the sample of values for this event parameter
N is the multiplicative factor of the standard deviation
StdDev is the standard deviation of the sample of values for this event parameter
MinThreshold and MaxThreshold specify a range of values for the event parameter that are always considered valid.

The following is an example of implementation of such a formula in one embodiment of the invention. Consider a program that runs on some CD and typically consumes between 90 Mbytes and 110 Mbytes of virtual memory. That is, the mean virtual memory use is 100 Mbytes and the standard deviation is 10 Mbytes. Now suppose a run of the program suddenly consumed 200 Mbytes of virtual memory. Further suppose that the multiplicative factor (N) is 2, and that MinThreshold is 80 Mbytes and that MaxThreshold is 120 Mbytes. If we substitute these values into the above formula, we arrive at the computation that will provide the answer:

((200<100−2*10) or (200>100+2*10)) and
((200<=80) or (200>=120))

Reducing the computations to simple logic, we have: ((false) or (true)) and ((false) or (true)). This results in an affirmative detection of an anomalous event because the current value exceeds twice the standard deviation and is outside the safe threshold levels.

The model described previously uses data and computations collected from the CD (CurrentValue, Mean and Std-Dev) but also uses three more arbitrary values (N, MinThreshold, MaxThreshold). The sensitivity to false negatives and false positives lies in the setting of these values. To ensure that anomalies are not falsely detected or missed, it is helpful to observe the following rules:

Each of these values should have reasonable default values provided by the system for each type of data collected.
A reasonable default for N, in all cases, is 2.
Reasonable defaults for MinThreshold depend on the type of data to which it is applied but should never be less than the minimum value the data can experience (e.g. setting MinThreshold to −1 for virtual memory consumption is meaningless since the minimum memory usage is 0).
Reasonable defaults for MaxThreshold depend on the type of data to which it is applied but should never be greater than some nominal upper bound for the type of data (e.g. setting the MaxThreshold for memory consumption higher than the available memory on the machine is not useful).
The operator of the TMS system should be able to adjust these values on a case-by-case basis.
N should never be less than 1 or greater than 5.
Pick MinThreshold such that Mean−5*StdDev<=MinThreshold
Pick MaxThreshold such that Mean+5*StdDev>=MaxThreshold If an anomalous event is not detected (918) then processing loops back to the termination check (903). If an anomalous event is detected (918), the anomalous event is evaluated (919) for its threat status. This evaluation consists of comparing configured policies against the anomalous events to determine (919) the seriousness of the threat to the CD. If the anomalous event is not considered a new threat (920), and/or a new threat is not detected (920) then processing loops back to the termination check (903). If the anomalous event and/or threat is new, then a new threat profile (907) is created (921) for later use in threat evaluation. Additionally, the new threat profile is sent (922) to the Threat Information Propagation Service (TIPS) module. Processing then continues with the termination check (903).

In one embodiment, the Client Device (CD) module/model may include one or more data sets. In a non-limiting example, the CD module/model is an acyclic hierarchical containment graph of the physical and logical hardware and software modules of the Client Device modules. These hardware and/or software modules may include those of the Client device module that are subject to security issues. The security issues may be any type and/or kind of security issue or threat, contemplated in the art, or as described herein. The CD module/model reflects the active, or current, state of the Client Device module. Additionally, the CD module/model tracks the historical record of the events that produced the active/current state, backwards in time for some determined and/or configured period of time, typically one to six months. The CD module/model may be the main data set used in the detection of threats (908).

In another embodiment, there may be one or more threat profiles and/or threat profile modules. A threat profile and/or threat profile module is a data set that captures information about a threat. In a non-limiting example, the threat profile and/or threat profile module details one or more fingerprints of the threat for rapid identification. The fingerprint information consists of patterns to be compared with the CD Model, either the active model or the sequences of events that produced the active model. Additionally, the threat profile and/or threat profile module details one or more sets of response script templates that may be used to generate a response script when a threat is detected. The response script templates comprise lists of generic (independent of type of Client Device module) actions to be customized with the details of the detected threat and specifics of the Client Device module. Threat Profiles are used by the TES module to detect threats (908) created by the TES module based on anomalous events (921). The threat profiles are sent to the TIPS (922) for wider distribution to other Threat Management Server (TMS) modules.

In yet another embodiment, as illustrated in FIG. 9 and discussed throughout the application, the method includes creating (910) and updating (912) incidents. An incident (911) records the related set of behaviors and detailed event logs upon detection of a threat. As threats are detected they are correlated in time and by relationship. In a non-limiting example, if the same kind of threat occurs on different CD's within a reasonably short time period, they are considered the same incident. Incidents track threats that have occurred and detail all the steps that lead to the detection of the event. Incidents also track forensic level detail of all the contextual and volatile information from the Client Device module that is affected by the compromised elements of the CD module.

In another non-limiting example, if a process on a machine is detected as a threat by its behavior then as much information from the CD module/model is gathered about that process, i.e., who ran it, what program it is running, what operating system resources it is using, etc.

In still another embodiment, as illustrated in FIG. 9 and discussed throughout the application, the method includes formulating (914) response scripts. A response script comprises a sequence of actions to be executed by a Client Device module in response to a threat. Actions can range from simple increases in the level of monitoring of affected CD module/components to powering down the CD module. The set of actions that are permissible are defined by the TRS module for a given type of CD module. The response scripts generated by the TES module are generic (independent of the type of CD). The Threat Response Service module, shown further in FIG. 10, translates the generic response scripts sent by the TES module into specific response scripts for individual CD instances. This division of labor simply removes the customization burden from the busy TES module.

FIG. 10 is a flowchart illustrating a Threat Response Service (TRS) of a method for threat detection and management. The TRS module functions to receive generic response scripts from the Threat Evaluation Service module (TES). Additionally, the TRS module determines to which of the Client Device (CD) modules the script pertains. For each of those CD modules, the TRS module first develops a response script tailored to that CD module's configuration. The TRS module then sends the response script to the Threat Response Agent on that CD module and further ensures that the response script is completed correctly.

In a non-limiting exemplary embodiment, the TRS module may issue a preventative response to an attack that states, "Prevent TCP/IP listen and connection on port 2042 on any Windows 2000 SP4 machine." The TRS module reviews the list of machines being monitored to find the Windows 2000 SP4 machines and formulates an action script that will block port 2042 on those machines based on the system model of each machine at the time. This is important because one Client Device Module may already be listening on port 2042 while another is not. The action scripts to block the port may be different for these two machines.

Also shown in FIG. 10, the TRS module starts by reading (1001) the TRS module configuration data (1002). The configuration data may include specifications and/or instructions for which TRA modules the TRS module is responsible and how to connect to the specified TRA modules. The TRS module then checks (1003) to see if it must terminate. If a termination condition is found then the TRS module terminates. If no termination condition is found, the TRS module continues by waiting (1004) for a generic response script to be delivered from the TES module. The response script is reviewed (1005) to determine the applicable set of Client Device modules. A loop is entered (1006) that spawns (1007) a process thread for each Client Device module affected by the response script received from the TES module. When all the threads have been spawned, the main thread terminates via END (1008) and Join Threads (1012), and loops back to the termination check (1003).

Also shown in FIG. 10, in each of the spawned threads, the response script is customized (1009) for the corresponding Client Device (CD) modules. Customization (1009) comprises adjusting the response script based on the active state of the Client Device module, as illustrated in FIG. 9. In a non-limiting example, if the Client device module is running a firewall that is already blocking port 2042, there is no need to request that the CD block port 2042.

Additionally, shown in FIG. 10, once the customization (1009) is completed, the TRS sends (1010) the completed script to the TRA module via a network connection. Subsequently, the TRA waits to confirm (1011) completion and/or final execution of the script. If the script did not complete successfully, the TRS module takes corrective actions, i.e., repairing the script and retrying, until the TRA module can confirm successful execution of the script. The thread then terminates (1012) and joins (1012) with the main thread to loop back to the termination check (1003).

In one embodiment, the TRS module may function to direct the TRA module to take the following kinds of actions: acquire more detail around certain system components (hardware, processes, files, etc); notify the console user with some standard or specific message as a notification of actions being taken; initiate corrective actions to repair the client device module/machine from a previous attack; initiate preventative actions to stop a predicted attack from causing damage; initiate changes in information collection strategies, such as but not limited to, start collecting evidence grade information instead of just state change information; and so forth.

FIG. 11 is a flowchart illustrating a Threat Management Repository (TMR) module of a method for threat detection and management. The TMR module functions and/or is responsible for securely storing the data needed by the other modules/components to perform their functions. The TMR module may be embodied in a database module for the information used by the other modules/services on the Threat Management Server TMS. In one embodiment, any module of the TMS server/module may access the data stored in the TMR module.

As shown in FIG. 11, the TMR module begins by reading (1101) the TMR module configuration data (1102). The TMR module may comprise data and/or information about how to connect to the repository or storage module and where the TMS module's data is stored. The TMR module opens (1103) the repository and checks (1104) the termination condition. If a termination condition is present then the repository is closed (1105) and the TMR module stops. If there is no termination condition present, the TMR module manages requests for repository data (1106). Such request may include, but are not limited to, incidents (1107), CD module/models (1108), threat profiles (1109), and/or so forth, as described herein.

In one embodiment, the TMR module manages requests for repository data. Some non-limiting examples of managing request may include: waiting for a request from one of the other components; reading the data from the repository and presenting that data to the requesting component; handling updates to the repository data from the other components; ensuring that updates are atomic, consistent, independent and durable (ACID test); providing for backup and restore of the repository information, guarding against loss of data; multiplexing asynchronous requests for data from competing execution threads; and/or so forth.

In another embodiment, the TMR module may be and/or may include an object base that retains models and/or data configurations of the Client Device modules and/or monitored systems (CDs) and how those Client Device modules and/or monitored systems (CDs) are changing over time. As information is collected from the CD modules, a representation of the hardware, software and operating system abstractions is maintained in the TMR module. For each CD module/machine a complete log of the changes to the model is retained so that it is possible to reconstruct the state of the machine at any point in time.

In yet another embodiment, the models and/or data configurations may comprise a set of abstractions. In a non-limiting example, the majority of the abstractions are generic. However, some abstractions may be adapted to specific operating systems or even specific applications by using the principles of inheritance and polymorphism. In another non-limiting example, the models and/or data configurations defined do not need to collect every bit of information on the monitored machine. Rather, the models and/or data configurations may focus on those portions of the client device module and/or system that may be vulnerable to attack, that are sensitive if they were attacked, and/or that may provide valuable forensics information if an attack occurs.

FIG. 12 is a flowchart illustrating a Threat Information Propagation Service (TIPS) module of a method for threat detection and management. The (TIPS) module receives new threat profile data from the Threat Evaluation Service (TES) module and propagates it to other TIPS modules/components on other Threat Management Servers.

As shown in FIG. 12, the TIPS module begins by reading (1201) the TIPS module configuration data (1202). The configuration data comprises network identification of the TIPS modules/components running in other TMS instances for both upstream and downstream communications. The TIPS modules/service may be configured with multiple upstream/ or and downstream connections. In this manner there may be flexibility in the manner in which threat information/data is federated and/or propagated. After reading the configuration data (1202), the TIPS checks (1203) for a termination condition. If there is a termination condition, the TIPS module terminates. If no termination conditions are present, the TIPS module waits (1204) for a notification that a threat profile from the TES module or from a downstream TIPS module instance (1204) is ready. If the notification was received (1205) from the TES module, the notification/data is read (1206) and/or received (1206) from the TES module. Similarly, if the notification was received (1205) from another TIPS module, the notification is read (1207) and/or received (1207) from other TIPS module. Each notification/profile, whether received (1205) from the TES module or another TIPS module, initiates an upstream TIPS module instance (1208) a new processing thread is spawned (1209). When all threads have been spawned (1210), the main thread loops back to the termination condition (1203) via (1212). Each spawned thread notifies (1211) the foreign TIPS instance and sends (1211) the threat data/information to the foreign TIPS module. Upon completion of threat information delivery (1211), the spawned thread rejoins (1212) the main thread and loops (1212) back to the termination check (1203).

In one embodiment, there may be protocols and/or modules which function in communicating, propagating, delivering and/or sending data/information between each of the TIPS modules. In a non-limiting example, there is a PinpointID module. The PinpointID module communicates using various communication protocols. Each communication protocol is secured by industry standard security protocols such as, but not limited to TLS 1.1 (Transport Layer Security). These security protocols provide authentication, authorization, data integrity, data encryption and other measures. In addition to the security protocol, the PinpointID module defines a protocol for the component pairs to communicate. Further, each PinpointID module/protocol may share a common architecture and together can be viewed as a protocol family.

In another embodiment, the communication protocols may be arranged in stacks. A protocol stack is composed of the following layers. The first four layers map to the OSI model. From there the protocol stack diverges to accomplish the purposes of the PinpointID, as contemplated in the art, or as described herein. Some non-limiting examples of layers in a protocol stack may include: link layer (1), which includes any physical media, CAT5, IEEE 802.3, permitted by network layer (2) that allows at least 1 Mbps of continuous throughput; network layer (2), which includes IP Protocol as defined in IETF Request For Comment (RFC) 791, which is incorporated by reference herein for its supportive teachings; transport layer (3), which includes TCP Protocol as defined in IETF RFC 793, which is incorporated by reference herein for its supportive teachings; session layer (4), which includes TCP Protocol as defined in IETF RFC 793, which is incorporated by reference herein for its supportive teachings; security layer (5), which includes TLS 1.1 as defined in IETF RFC 4346, which is incorporated by reference herein for its supportive teachings; message layer (6), which includes a generic object-oriented, model based message protocol; and/or an application layer (7), which includes specific objects and methods to transmit over layer 6. layers five (5) through seven (7) are further defined below. More detail may found regarding layers one (1) through four (4) in the IETF RFC, which is incorporated by reference herein for its supportive teachings.

In yet another embodiment, the protocol stacks include a security layer module. The security for the protocols is provided by the TLS 1.1 protocol as defined in IETF RF 4346 (The Transport Layer Security (TLS) Protocol Version 1.1) and updated in IETF RFCs 4366 (TLS Extensions), 4680 (TLS Handshake Message for Supplemental Data), and 4681 (TLS User Mapping Extension), which are incorporated by reference herein for their supportive teachings. The security protocol module protects the higher layer protocols from a variety of security problems, by providing at the very least: data integrity, which includes the ability to detect data corruption (altered packets) during transmission; confidentiality, which includes the data stream is encrypted using public key encryption to exchange private keys, wherein keys are regenerated upon request of either party to the communication; strong encryption, which includes encryption keys of at least 1024 bits; server authentication, which includes the client, assures that the server connected to is the correct one; client authentication, wherein the systems verify the identify of the client module devices and/or users; continuous service, wherein the protocol is not vulnerable to Denial of Service (DoS) attacks; and/or ubiquitous access, which includes the protocol is adept at transmission through NAT and other networking equipment.

In still another embodiment, the protocol stacks include a message layer module. In each protocol the SSL payload may comprise a bi-directional conversation of object-oriented message sends. Object instances are tracked on both ends of the communication and messages can be invoked directly on those objects. In a non-limiting example, the model could be implemented as a pair of Python interpreters that send program text back and forth that is executed against the object models represented in each Python instance. Each side of the communication provides a set of Python objects to which messages may be sent.

In one embodiment, this arrangement implements a model-based communication protocol. Protocols share a common syntax, in this example provided by the following grammar in Extended Bachus-Naur Form (EBNF) notation. We can understand the EBNF notation with these simple rules:

the ::= operator introduces a production rule with its name to the left of ::= and its definition to the right of ::= the | operator means a choice between two or more alternatives parentheses ( ) are used for grouping curly braces { } mean 0 or more occurrences of the contained entity (closure)

square braces [ ] mean 0 or 1 occurrence of the contained entity (i.e. optional)

literal characters or character sequences are quoted with single quotes.

The ellipsis operator ( . . . ) between two literals is a short-form of the alternative operator, |, that specifies the range of characters between and including the literals on either side of the ellipsis.

The dot operator (.) means any character except double quote where double quote can be included by escaping it with \. That is, abc" does not match but abc\" matches the letters a, b and c followed by a quote character.

The model-based communication protocols that follow all use this common grammar:

conversation::={transaction|result|top_level_message}
transaction::=identifier '{' message* '}' NL
result::=RESULT '(' identifier ')'"=' value NL
top_level_message::=identifier ':' message
message::=object_id '.' method_name '(' [argument_list] ')' NL
object_id::=class_name '[' value ']'
method_name::=identifier
class_name::=identifier
argument_list::=(argument {',' argument})|( )
argument::=identifier '=' value
identifier::=ALPHA {ALPHA|DIGIT|'_'|'-'}

```
value::=identifier|number|''''.''''
number::=['+'|'-'] DIGIT {DIGIT} ['.' DIGIT {DIGIT}]
ALPHA::='A' ... 'Z'|'a' ... 'z'
DIGIT::='0' ... '9'
RESULT::='r''s''l''t'
NL::=['\r'] '\n'
```

In the protocol grammar illustrated above, production names in lower case are non-terminal while production names in upper case are terminal. For clarity, an English translation of this grammar reads:

A conversation is a list of 0 or more transactions or top-level messages.

A transaction is an opening curly brace followed by 0 or more messages followed by a closing curly brace followed by an NL (new line).

A result is the keyword RESULT followed by an opening parenthesis, an identifier, a closing parenthesis, an equal sign, a value and an NL (new line).

A top-level message is an identifier followed by a colon followed by a message.

A message is a sequence of an object identifier followed by a dot, a method name, an opening parenthesis, an argument list, a closing parenthesis and an NL (new line).

An object identifier is a sequence of a class name followed by an opening square bracket, a value (that identifies the instance of the class), and a closing square bracket.

A method name is an identifier

A class name is an identifier

An argument list is an argument optionally followed by 0 or more pairs of comma and an argument; or, it is completely empty An argument is an identifier (the name of the argument) followed by an equals sign followed by a value.

An identifier is an alphabetic character followed by 0 or more characters that can be alphabetic, numeric, an underscore or a dash.

A value is an identifier or a number or a quoted string of any character.

A number is an optional plus or minus sign followed by a digit optionally followed by a sequence of digits, a dot and a digit, and a sequence of zero or more digits.

An ALPHA is any alphabetic character

A DIGIT is any of the ten digits

A RESULT is the letters r, s, l and t.

An NL (new line) is an optional return character and a new line character.

Several key factors should be noted from this grammar:

Transactions are intended to group related sets of messages.

The basic unit of the language is a message since transactions are just lists of messages.

The grammar does not specify the entire protocol, only the syntax of the data flowing in either direction.

The grammar specifies the syntax of data sent between the two end points in both directions. Either end point may send messages, transactions or results.

Each transaction or top-level message is preceded by an identifier that serves to name the transaction or message. This identifier is intended to be used in a response transmission from the receiver of the transaction or top-level message. It specifies to which top-level message or transaction the result pertains.

Responses are not necessarily synchronous or serial with their corresponding top-level message or transaction. That is, the response for any given transaction or top level message could come before or after subsequent transactions, top level messages or even results.

Unlike many programming languages, white space is constrained in this grammar. Only the new line production is permitted as white space at the ends of transactions and messages. This ensures that data transmitted is terse to reduce bandwidth requirements.

FIG. 13 is a non-limiting example of the message/response cycle provided for by the protocols to show how asynchronous responses to messages work.

In an additional embodiment, the protocol stacks include a application module (layer 7). With the facilities of layer 6 allowing an object-oriented, model-based approach to the communications, layer 7 defines specific objects and messages that may be transmitted over these layer 6 facilities. Each protocol defines its own set of objects and methods that are germane to the conversations it needs to hold. In this embodiment, objects and messages become similar to nouns and verbs of a conversation. This is called a Protocol Object Model (POM).

FIG. 14 provides the Protocol Object Model (POM) for the Threat Information Propagation Protocol (TIPP) module (226) of a method for threat detection and management. The TIPP module functions to federate threat profile information between TIPS (214) instances running in the TMS (210) modules. Additionally, the TIPP protocol is used to federate and synchronize information between TMS instances. In large networks, multiple TMS instances may be necessary to process the volumes of information produced by the CD machines. Additionally, organizations may wish to share threat information between their respective TMS instances and TIPP makes this sharing possible.

The illustrated TIPP POM consists of only one class that is named TIPPManager. The methods of TIPPManager are shown in FIG. 14.

In particular, the illustrated newProfile method sends a threat profile to the remote TIPS instance. It requires two arguments: an integer ProfileId that uniquely identifies the threat profile (a globally unique identifier or GUID), and a string that contains the definition of the threat profile. The result is an integer result code describing the success of the method. A zero valued result indicates success. A non-zero valued result indicates failure.

The illustrated deleteProfile method is used by a TIPS sender to notify a TIPS receiver that a profile should be deleted. The method includes one parameter: an integer ProfileId (GUID) for the profile to delete. This method may be called whenever a TMS determines that a threat profile is no longer needed because it has been superseded by a subsequent threat profile.

The illustrated lastProfile method is used by the TIPS sender to ask the TIPS receiver for the creation date of the most recent profile that it knows about. The method generally takes no arguments and returns a string providing the requested date. If the TIPS receiver has no profiles then it returns an empty string as a signal of this condition. This method is used by a TIPS sender to synchronize itself with a TIPS receiver and avoid sending redundant threat profiles.

The illustrated onlySince method is used by the TIPS receiver to notify the TIPS sender that it should only send threat profiles (invoke the newThreat method) for profiles that were detected after the Date provided by the parameter. There is no return value. This method is used by a TIPS receiver to synchronize itself with a TIPS sender by informing the sender of the earliest dated threat profile it should send.

The illustrated newVector method is used to transmit an attack vector to the TIPS receiver. The method includes three parameters: an integer VectorId (GUID) that uniquely identifies the attack vector, an integer ProfileId (GUID) that uniquely identifies the threat to which the vector applies and a string that contains the attack vector information. The result is an integer result code describing the success of the method. A zero valued result indicates success. A non-zero valued result indicates failure. This method is used when an attack vector pertaining to a threat profile has been determined. Attack vectors indicate the source(s) from which threats can emanate.

FIG. 15 shows a non-limiting example of a communication between a TIPS sender and receiver, to suggest the mode of communication. The sender initiates the conversation by invoking the lastProfile method on the receiver. The receiver responds with the date and time of the last profile the receiver has on file. Using this information the sender invokes the newProfile method, providing a profile id of 1 and specifying the profile data as a string. Note that the date of the profile is after the date provided by the receiver as the result of the lastProfile method invocation. Finally, the receiver indicates that the newProfile method was successful by returning a result value of zero.

In one embodiment of TMS protocols, the TRPmodule includes one or more message objects. A message object functions and/or enables messages to be sent to the user of the Client Device module. The message object may comprise the following the following methods: notifyFreeForm(string), wherein a string argument is used to present the user with a textual message; and notifyStandard(int, . . . ), wherein, an int argument provides the index of a standard message, and subsequent arguments and/or strings are substituted into corresponding placeholders in the standard message.

In another embodiment of TMS protocols, the TRP module includes one or more detector objects. The detector object functions to provide a communication path to the TDA's module detector component. The detector object comprises one or more of the following methods:

StartInvestigation(objid), which requests that the object that is identified with the objid identifier be put under scrutiny. Accordingly, all actions it takes and associations it has are reported via the TDP module.

EndInvestigation(objid), which requests that the object that is identified with the objid identifier be removed from scrutiny. Accordingly, this returns the object to a normal level of tracking;

ThrottleEvenType(typeid), which requests that the TDA (201) module begin throttling of all events of type typeid. The throttling algorithm is left to the discretion of the TDA; and ThrottleEventTypeForObject(typeid, objid), which requests that the TDA begin throttling of all events of type typeid on the object objid.

In yet another embodiment of TMS protocols, the TRP module includes one or more system objects. The system objects function to provide actions regarding the operating system. Some system objects include:

shutdown( ), which causes a shutdown of the Client device (CD) module without restarting;

restart( ), which causes a restart of the CD module;

lockInput( ), which functions to prevent the user from interacting with the CD module;

unlockInput( ), which functions to allow the user to interact with the CD module;

beginCapture( ), which requests that the TDA capture screen shots, i.e., 2 ce per second, and all input events from the user;

endCapture( ), which ends the process started with beginCapture( );

containProcess(pid), which requests that the TDA put the process identified by pid in containment thereby preventing it from taking any destructive actions, i.e., sending data on the network, writing files, etc.;

releaseProcess(pid), the converse of containProcess, allowing the process identified by the pid to function normally;

blockPort(portid), which requests that the TDA module block all communication on the port identified by portid; and unblockPort(portid), which requests that the TDA module unblock communications on the port identified by portid, thereby restoring normal function; and/or so forth.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes, which come within the meaning and range of equivalency of the claims, are to be embraced within their scope.

For example, although the figures illustrate particular relationships among components, it is understood that additional relationships may be present and that differing relationships resulting in substantially similar functional results are contemplated.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A system for real-time detection and management of security threats, to a computer system having a Local Area Network (LAN), based on system state changes, not based on network packet data, and without third party detection software, comprising:
 a) a threat detection agent (TDA) module, being part of the LAN, in communication with a client device and comprising circuitry and memory that includes:
  a1) instructions, in the form of system state data, for observing activity occurring on a client device;
  a2) instructions controlling collection of system state data from the client device;
  a3) instructions comparing a current configuration of the client device system state data against a previously saved system state data configuration file and generating a threat detection signal when the observed system state data configuration differs from the previously saved system state data configuration file;
  a4) instructions for reporting an identified threat detection signal activity related to the client device; and
  a5) a detector module and a collector module, each stored in the memory, wherein the collector module creates an event log and the detector module includes a pattern space of threat fingerprints, and the detector module categorizes and prioritizes events by comparing events from the event log to the pattern space, wherein each threat fingerprint consists of one or more specific events that imply an attack is underway, wherein the detector module initializes the pattern space from a collection of the threat fingerprints, wherein patterns in the pattern space specify events and context that represent threats;

b) a threat response agent (TRA) module, being part of the LAN, in communication with the client device and comprising circuitry and memory that includes:

instructions for altering an operating characteristic of a client device in response to a threat response signal; and c) a threat management server (TMS) module, being part of the LAN, in communication with the TDA and with the TRA and physically remote from the client device, the TMS comprising circuitry and memory that includes:

c1) a threat detection service (TDS) module stored in the memory, and in communication with the TDA, whereby the TDS receives threat information from the TDA;

c2) a threat response service (TRS) module stored in the memory, and in communication with the TRA, whereby the TRS relays threat response instructions to the TRA; and c3) a threat evaluation service (TES) module stored in the memory, and in communication with the TDS, whereby the TES evaluates threat information received by the TDS and determines an appropriate response as well as determines whether an attack represents a new threat profile.

2. The system of claim 1, wherein the TDA includes a reporter module.

3. The system of claim 1, wherein the TRA is in communication with the TRS through an authenticated and authorized communication channel.

4. The system of claim 1, wherein the TMS retains an active model of the client device and retains a historical model of the client device.

5. The system of claim 1, wherein the TDS is in communication with the TDA through an authenticated and authorized communication channel.

6. The system of claim 1, wherein the TDS maintains a system model of the client device and communicates system changes to the TES.

7. The system of claim 1, wherein the TES determines if a new threat is in progress and if so initializes a new incident to track information regarding the threat as the threat continues.

8. The system of claim 1, wherein the TRS throttles on forensics quality information collection on the client device when an emerging threat is detected.

9. The system of claim 8, wherein a threat management repository comprises memory that stores the forensics quality information throughout an emerging attack and makes it available as real-time forensics to an end user forensics investigator via a threat console services and a threat management console.

10. The system of claim 9, wherein the forensics quality information is stored using algorithms to ensure that a forensics evidence is preserved for future legal proceedings.

11. The system of claim 1, wherein the TRS compares a response script to a relevant characteristic of the client device before execution of the response script;

the system further comprises:

a threat information propagation service (TIPS) module comprising circuitry and memory, and in communication with the TES and configured to transfer threat profiles of new attacks;

a threat management repository (TMR) module comprising memory, and in communication with the TES and with the TIPS and configured to store threat information; and a Threat Console Services (TCS) module comprising circuitry and memory, and in communication with the TMR and the TES configured to construct and issue user interface display instructions and information; and a threat management console (TMC) module stored in a memory, and in communication with the TCS and configured to display user interface information and provide controls for delivering control information over the control protocol.

12. The system of claim 1, wherein the TRS modifies a response script according to a characteristic of a client device.

13. The system of claim 1, wherein the system comprises a threat management console module stored in a memory and configured to display information regarding a response script and enables a user to alter the displayed response script before execution thereof.

14. The system of claim 1, wherein the system comprises a threat management console module stored in a memory and configured to display an event and enables a user to enter a response script and cause execution of the response script in the client device.

15. A method of real-time detection and management of security threats, to a computer system having a Local Area Network (LAN), based on system state changes, not based on network packet data, and without third party detection software, comprising the steps of:

observing activity on the computer system in the form of system state data, related to a remote client device among a plurality of client devices remote from each other;

comparing the observed activity on the computer system in the form of system state data, with a threat profile;

generating a threat detection signal on the computer system, including threat information when the observed activity matches the threat profile, in the form of system state data;

altering an operating characteristic of a client device on the computer system, in response to a threat response signal, in the form of system state data;

receiving the threat information on the computer system;

evaluating the threat information on the computer system;

automatically determining an appropriate response to the threat detection signal based on an evaluation of the threat information on the computer system in the form of system state data;

comparing on the computer system, the threat detection signal to known threat patterns;

distributing on the computer system new threat information if the threat detection signal does not match a known threat;

using on the computer system, the threat information to construct additional new threat patterns;

storing on the computer system, threat information;

providing on the computer system, a user interface information and controls for delivering control information over a control protocol;

creating an event log;

providing a pattern space of threat fingerprints, wherein each threat fingerprint consists of one or more specific events that imply an attack is underway, wherein the pattern space is initialized from a collection of threat fingerprints, wherein patterns in the pattern space specify events and context that represent threats; and categorizing and prioritizing events by comparing events from the event log to the pattern space.

16. The system of claim 1, further comprising multiple TMS modules forming a federated database, where the threat information from multiple TMS modules are collected and reviewed to provide the pattern space of threat fingerprints, wherein each threat fingerprint consists of one or more specific events that imply an attack is underway.

17. The system of claim 16, wherein the TDA sends instruction to the TDS to terminate a connection with the TDS.

18. The method of claim 15, wherein storing on the computer system, threat information includes relaying threat information to a federated database of the computer system, where the threat information from multiple sources are collected and reviewed to provide the pattern space of threat fingerprints, wherein each threat fingerprint consists of one or more specific events that imply an attack is underway.

19. The system of claim 18, further comprising sending instruction from the TDA to the TDS to terminate a connection with the TDS.

* * * * *